United States Patent [19]

Ichijima et al.

[11] Patent Number: 4,711,837

[45] Date of Patent: Dec. 8, 1987

[54] SILVER HALIDE COLOR PHOTOGRAPHIC MATERIAL

[75] Inventors: Seiji Ichijima; Mitsunori Ono; Isamu Itoh; Keiji Mihayashi; Koji Tamoto; Yoshisada Nakamura, all of Kanagawa, Japan

[73] Assignee: Fuji Photo Film Co., Ltd., Kanagawa, Japan

[21] Appl. No.: 769,903

[22] Filed: Aug. 27, 1985

[30] Foreign Application Priority Data

Aug. 27, 1984 [JP] Japan ................. 59-177670

[51] Int. Cl.$^4$ .................. G03C 1/40; G03C 7/32; G03C 7/26
[52] U.S. Cl. ..................... 430/548; 430/553; 430/555; 430/557; 430/558; 430/559; 430/562; 430/958
[58] Field of Search ............ 430/226, 559, 562, 553, 430/555, 557, 558, 548, 958

[56] References Cited

U.S. PATENT DOCUMENTS

| | | | |
|---|---|---|---|
| 3,725,062 | 4/1973 | Anderson et al. | 430/559 |
| 4,248,962 | 2/1981 | Lau | 430/958 |
| 4,358,525 | 11/1982 | Mooberry et al. | 430/559 |
| 4,421,845 | 12/1983 | Uemura et al. | 430/559 |
| 4,468,449 | 8/1984 | Arbree et al. | 430/958 |
| 4,546,073 | 10/1985 | Bergthaller et al. | 430/558 |

FOREIGN PATENT DOCUMENTS

| | | |
|---|---|---|
| 87930 | 2/1983 | European Pat. Off. . |
| 174873 | 9/1985 | European Pat. Off. . |
| 2414745 | 8/1979 | France . |

*Primary Examiner*—Richard L. Schilling
*Attorney, Agent, or Firm*—Sughrue, Mion, Zinn, Macpeak, and Seas

[57] ABSTRACT

A silver halide color photographic material comprising a support having provided thereon at least one silver halide emulsion layer, wherein the photographic material contains a compound having a dye portion in which the maximum absorption wavelength is shifted by a bond that is cleaved upon reaction with an oxidation product of a developing agent and is capable of forming a diffusion resistant compound having a dye portion possessing the maximum absorption wavelength which is not shifted as a result of the reaction with an oxidation product of a developing agent.

By the use of the compound which permits a large degree of freedom with respect to selection of the dye for forming a color image according to the present invention, the color photographic material has an excellent image quality, and a good fastness of image or a high sensitivity.

46 Claims, No Drawings

SILVER HALIDE COLOR PHOTOGRAPHIC MATERIAL

FIELD OF THE INVENTION

The present invention relates to a silver halide color photographic material containing a dye, the spectral absorption wavelength of which is shifted and which forms a dye, the spectral absorption wavelength of which is not shifted upon the reaction with an oxidation product of a developing agent.

BACKGROUND OF THE INVENTION

It is known that upon color development of a silver halide color photographic material, coupler reacts with an oxidation product of an aromatic primary amine color developing agent to form a dye such as indophenol, indoaniline, indamine, azomethine, phenoxazine, phenazine, or the like, thereby a color image is formed.

In this system, color reproduction is usually accomplished with the subtractive color process and silver halide emulsions selectively sensitive to blue, green and red, and yellow, magenta and cyan color image forming agents (couplers) in a complementary relationship therewith are employed.

The properties of color photographic light-sensitive materials have recently improved. For example, improvement in image qualities such as color reproducibility, sharpness or graininess, etc., improvement in color image preservability to heat, light or humidity, and increase in sensitivity, etc. In the process of the improvement in these photographic properties, progress in the molecular design of the color image forming couplers has carried out a great role because there is a relationship between the properties of couplers and the properties of photographic light-sensitive materials. More specifically, when an absorption spectrum of a dye formed upon the coupling reaction of coupler with the oxidation product of a developing agent is broad or has a subsidiary absorption, color turbidity occrurs which results in damage of the color reproducibility. Further, since the amount of couplers incorporated into the emulsion layer can be reduced with an increase in the amount of dyes which are formed per an unit weight of the couplers, the thickness of the layer can be reduced which results in improvement in sharpness. Moreover, the image preservability is improved as the stability of the dyes formed from couplers to heat, light or humidity is increased. Furthermore, as the rate of the coupling reaction of the coupler with the oxidation product of the developing agent is larger, the development of silver occurrs more efficiently, which results in an increase in the sensitivity of the photographic light-sensitive material.

Various kinds of couplers have been proposed for the purpose of improvement of the photographic properties described above. For example, 5-pyrazolone type couplers which form axomethine dyes having a little subsidiary absorption on the short wavelength side are disclosed in *Journal of Chemical Society, Perkin I,* page 2047 (1977). In U.S. Pat. No. 4,248,961, bis-type yellow couplers are disclosed in order to decrease the molecular weight of the couplers necessary to form a certain density of dyes. Further, couplers which provide color images of improved fastness are disclosed in U.S. Pat. Nos. 3,311,476 and 4,124,396. Moreover, couplers having a high color forming property which are advantageous for the purpose of achieving high sensitivity are disclosed in U.S. Pat. Nos. 4,296,199 and 4,301,235.

As described above, it is recognized that the properties of recently provided couplers are improved to some extent. However, further improvement in their properties is difficult due to the restriction on the molecular design of couplers. This is because the properties of the dyes formed from couplers are determined by the molecular structure of the couplers, which is a feature that the above described couplers known heretofore commonly possess. It is natural when considering that the azomethine dyes are formed upon the coupling reaction of the couplers with the oxidation products of developing agents.

On the other hand, this makes an unavoidable limitation in the molecular design of the couplers and causes several contradictions. For example, when the molecular structure of the coupler is designed only taking into consideration increase in the coupling speed, sometimes the absorption spectrum of the dye formed from the coupler thus-obtained is different from the desired color or a subsidiary absorption of the dye is large. As a result, the coupler can not be practically used. Further, a coupler having a low speed of coupling with the oxidation product of a developing agent can not be employed even if it is excellent in chemical stability and can form a dye of good fastness. On the contrary, a coupler which forms a dye having a sharp spectral absorption curve whithout subsidiary absorption can not be utilized in photographic light-sensitive materials when the coupler pe se is unstable or the dye formed therefrom is not stable. Moreover, when a dye having a large molecular extinction coefficient ($\epsilon$) which is advantageous for reducing the thickness of the emulsion layer is desired, it is impossible to utilize the dye if it can not be formed upon the coupling reaction thereof with the oxidation product of a developing agent.

These disadvantages are based on the utilization of dyes formed upon the coupling reaction of three kinds of couplers, i.e., yellow, magenta and cyan couplers with the oxidation products derived from the kind of developing agent. That is, the degree of freedom on the selection of the structure of dye is small, and thus the degree of freedom on the selection of the coupler is small. It is impossible, therefore, that each of the various properties required for the couplers is independently controlled so as to obtain the optimum conditions.

In other words, in the case of color image forming couplers heretofore known, it is obliged to compromise various photographic properties due to the several restrictions described above when a coupler having the desired properties is selected.

SUMMARY OF THE INVENTION

Therefore, an object of the present invention is to provide a silver halide color photographic material possessing an excellent image quality, a good fastness of image or a high sensitivity by utilizing a coupler which does not have the above described restriction and a large degree of freedom to select a dye for forming a color image.

Other objects of the present invention will become apparent from the following description and examples.

These objects of the present invention can be attained by a silver halide color photographic material comprising a support having provided thereon at least one silver halide emulsion layer, wherein the photographic light-sensitive material contains a compound having a dye portion in which the maximum absorption wavelength is shifted by a bond that is cleaved upon reaction with an oxidation product of a developing agent and is capable of forming a diffusion resistant compound having a dye portion possessing the maximum absorption wavelength which is not shifted as a result of the reaction with an oxidation product of a developing agent.

DETAILED DESCRIPTION OF THE INVENTION

In order to understand the meaning that a spectral absorption of a dye is shifted in the present invention, first of all, it is necessary to comprehend the reason why a dye has color. The color of a dye is generated by absorption of electromagnetic waves with a conjugated system of single bonds and double bonds formed in the molecule thereof. The absorption wavelength of the electromagnetic waves corresponds to an electron transition energy between energy levels according to the theory of molecular orbitals. Such a conjugated system is generally referred to as a chromophore. The chromophore usually has an atom or atomic group containing a lone pair at the end thereof. Such a group can expand the conjugated system of the chromophore and increase the color of dye. This group is generally referred to as an auxochrome and includes, for example, a hydroxy group, a mercapto group or an amino group, etc.

In accordance with the present invention, an auxochrome of the dye is blocked with a blocking group so as to change the spectral absorption characteristic of the dye by varying the conditions of the electrons utilized in a chromophore of the dye. When a bond between the auxochrome and the blocking group is maintained, a spectral absorption wavelength of the dye is changed to a shorter wavelength side (hypsochromically) or a longer wavelength side (bathochromically) than the desired wavelength. With the compound according to the present invention, at least one bond is cleaved after it is reacted with the oxidation product of a developing agent. This is a cleavage reaction of the blocking group which has blocked the auxochrome of dye and as a result the dye exhibits the desired color. Such a case wherein the spectral absorption wavelength of the dye is shifted by bonding with the blocking group as described above is defined as the spectral absorption wavelength of a dye which is shifted in the present invention.

The above described "temporary shift" can be carried out by blocking a hydroxy group or an amino group which is an auxochrome in the case of an azo dye. Since an azo dye can generally take hydrazo type tautomers having longer wavelength absorption and azo type tautomers having shorter wavelength absorptions, the azo dye can be made to have a shorter wavelength by fixing the azo type tautomer using a blocking group. Examples of dyes in the form of having a shorter wavelength with a blocking group include compounds as described in U.S. Pat. Nos. 4,234,672, 4,310,612, 3,579,334, 3,999,991, 3,994,731 and 3,230,085, etc. In these compounds, the blocking group is cleaved by hydrolysis with alkali at the time of development in photographic elements for diffusion transfer process.

On the contrary, the bond is cleaved upon the reaction thereof which the oxidaton product of a developing agent in the present invention, thereby an auxochrome is formed. Any of dyes which have an auxochrome capable of being blocked as described above can be employed. However, it is desirable that the maximum spectral absorption wavelength can be shifted in 20 nm or more, preferably in 40 nm or more, or a molecular extinction coefficient can be changed twice or more, preferably three times or more, between before and after cleavage of the bond upon the reaction with the oxidation product of a developing agent. The range of the shift or the change in the molecular extinction coefficient referred to herein includes that which may be achieved of together with other means. Examples of other means are the use of a mordant for maintaining the present state of the azo dye in the hydrazo type or a basic dispersion medium.

The compound according to the present invention is preferably used in conventional color photographic light-sensitive materials. The term "conventional" used herein means that a dye formed by photographic processing (a dye restored from a shifted dye) is utilized in a photographic layer. The photographic layer used herein, however, does not include an image receiving layer of a so-called diffusion transfer process. More specifically, the photographic layer according to the present invention does not include an image receiving layer in peel apart type film unit as described in U.S. Pat. No. 2,983,606, etc., an integrated type film unit as described in Japanese Patent Publication Nos. 16356/71 (corresponding to U.S. Pat. Nos. 3,415,644, 3,415,645 and 3,415,646) and 33697/73 (corresponding to U.S. Pat. No. 3,594,164), Japanese Patent Application (OPI) No. 13040/75 (corresponding to U.S. Pat. No. 3,993,486) (the term "OPI" as used herein refers to a "published unexamined Japanese Patent Application") and British Pat. No. 1,330,524, etc., or a film unit which does not need peeling apart as described in Japanese Patent Application (OPI) No. 119345/82.

It is necessary for the compound according to the present invention to cleave at least one bond in its molecule upon the reaction with the oxidation product of a developing agent at the time of development. Specifically, such a reaction includes a reaction in which a releasing group bonded to the coupling position is released as an anion upon the coupling reaction, and a reaction in which an oxidized compound formed from a reducing agent such as a hydroquinone or a sulfonamidophenol, etc. upon an oxidation reduction reaction is nucleophilically attacked by an anion such as a hydroxy ion, etc., whereby a releasing group bonded is released as an anion.

In the former case, the compound is one kind of coupler and it is possible to form two kinds of dyes in total, that is, an azomethine dye which is formed upon the coupling reaction and a dye which is formed from a dye previously shifted. In this case, the two kinds of dyes can be both utilized for the formation of color images, or only the dye which is formed from the shifted dye is employed for the color image formation by rendering the azomethine dye first formed alkaline soluble and dissolving out to a developing solution during development or by using a non-color forming coupler residue.

In the case of the latter compound which employs the oxidation-reduction reaction according to the present invention, the dye which is formed from the shifted dye can be utilized for the formation of color images.

The compound which is used as a color image forming agent according to the present invention is not necessary to be completely colorless in the form of the shifted dye. It is generally advantageous to shift the wavelength by blocking an auxochrome, since the molecular extinction coefficient is decreased to several tenths to several hundredths of the original. For example, the compound according to the present invention can be used as a yellow color image forming agent by incorporating into a blue-sensitive emulsion layer. Since the molecular extinction coefficient of the yellow dye is decreased as well as these is a shift of the wavelength by the blocking of the auxochrome thereof, apparent desensitization of the light-sensitive emulsion generated due to light absorption of the shifted dye (filter effect) is so small it can be ignored.

Further, the compound according to the present invention can be employed as a magenta or cyan color image forming agent by incorporating it into a green-sensitive or red-sensitive emulsion layer, respectively. A magenta dye or a cyan dye which is shifted to a shorter wavelength side by the blocking of an auxochrome thereof is advantageous because it also possesses a function of a conventional coupler for color correction (masking) and acts as a yellow colored coupler or a magenta colored coupler, respectively. In general, a colored coupler is used in a mixture with a coupler which is employed only for the formation of a color image. However, the compound according to the present invention can be used alone. The reason for this is that the shifted dye increases the molecular extinction coefficient when its color is recovered and in the case wherein a ratio of the molecular extinction coefficients in the shifted form and the non-shifted form thereof is consistent with a mixing ratio of a conventional colored coupler, it is not necessary to combine other color image forming couplers.

The fact that the compound according to the present invention can achieve the objects of the present invention is supported by the principle described in the following.

With the compound according to the present invention, the portion which reacts with the oxidation product of a developing agent and the portion which forms a dye can be functionally separated in the first process. In the second process, two kinds of dyes can be formed from only one oxidation products of a developing agent. Since it is impossible to realize these two processes using conventional couplers, the practicability of these two processes directly illustrates excellent effects according to the present invention.

More specifically, the with respect to the portion which forms a dye, the structural design thereof can be made taking into account only the properties of the dye which is formed after the cleavage of the blocking group. The degree of freedom with respect to the selection of the dye becomes accordingly greater than heretofore. Therefore, it is possible to select a dye which is hard to fade, a dye which is excellent in spectral absorption property, or a dye which has a large molecular extinction coefficient, etc. from a relatively wide range. As a result, improvement in color reproducibility, improvement in image preservability or improvement in sharpness resulting from the decrease in layer thickness, etc. can be achieved.

Further, the portion which reacts with the oxidation product of a developing agent can be designed with its structure only giving attention to the activity thereof. When a dye is released from a coupler, the color of the dye formed upon the coupling reaction of the coupler may be selected so as to be substantially consistent with the desired color, and the dye can be employed together with the dye formed from the shifted dye. In such a case, an amount to be added can be remarkably reduced with the compound according to the present invention in comparison with heretofore known color image forming couplers, and thus improvement in sharpness is obtained. On the other hand, in some cases it is necessary to utilize a coupler skeleton which forms a dye having color different from the desired color in order to place emphasis on the structural design for obtaining a large color forming rate. In such a case, the problem can be solved by rendering the azomethine dye formed upon the coupling reaction water-soluble and preventing it from leaving the light-sensitive material after development processing. As a result, a color image forming agent having a large color forming rate can be structurally designed more freely than ever and a light-sensitive material having a high sensitivity can be obtained.

The compound according to the present invention can be preferably represented by the following general formula (I):

$$A-X-Dye \qquad (I)$$

wherein A represents a group capable of releasing X-Dye which is diffusion resistant, upon the reaction with the oxidation product of a developing agent; X represents an oxygen atom, a sulfur atom or an imino group; and Dye represents a dye residue which has X as an auxochrome.

In the general formula (I), in order to render X-Dye diffusion resistant, it is preferred that X-Dye contains a diffusion resistant group. The diffusion resistant group used herein is a group which prevent from flowing of the dye formed by diffusion from the photographic element in which the dye is incorporated during development processing. For such a purpose, an organic group which increases the molecular weight is generally used. It is also possible to control so that a dye has a slight diffusibility by selecting a relatively small diffusion resistant group. In such a case, a dye cloud appropriately expands which results in improvement in sharpness. As described above, the size of the diffusion resistant group is selected depending on its purpose. Further, since the diffusion resistant property of the dye can be varied depending on a kind of the development processing to be employed, this factor should be also considered when the size of the diffusion resistant group is determined.

The dye residue represented by Dye is a residue of a dye in which the maximum absorption wavelength is shifted to a shorter wavelength side owing to the blocking of the auxochrome (X) with A. These dyes can be appropriately selected from those described in J. Fabian and H. Hartmann, *Light Absorption of Organic Colorants*, published by Springer Verlag, or their analogues rendered diffusion resistant. However, the present invention is not limited to these dyes.

In the general formula (I), the group represented by A is preferably a coupler residue or a hydroquinone. A and Dye may have a connection other than X to form a cyclic structure. Further, a bis type coupler in which two or more molecules are bonded at the portion of A or Dye or a polymer coupler may be used.

In the case of a system wherein the dye is released from a hydroquinone, the hydroquinone residues, for example, those described in U.S. Pat. Nos. 3,379,529 and 4,108,663, etc. can be employed.

The effects of the present invention are particularly exhibited when A in the general formula (I) represents a coupler residue represented by the general formula (II), (III), (IV), (V), (VI), (VII), (VIII), (IX), (X), (XI), or (XII) described below. These couplers are preferred because of their high coupling rates.

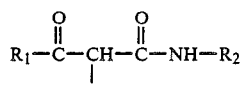  (II)

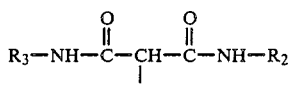  (III)

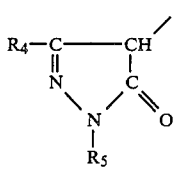  (IV)

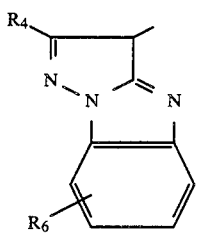  (V)

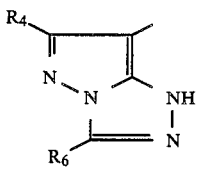  (VI)

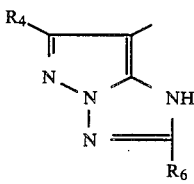  (VII)

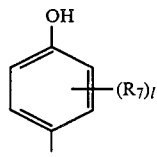  (VIII)

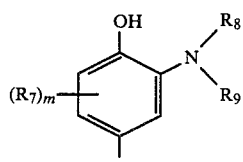  (IX)

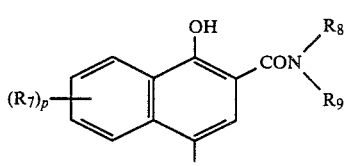  (X)

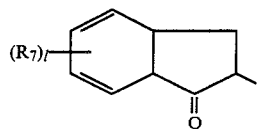  (XI)

$R_{10}-CH-R_{11}$  (XII)

In the above-described general formulae, a free bond attached to the coupling position indicates a position to which a group capable of being released upon coupling is connected. When $R_1$, $R_2$, $R_3$, $R_4$, $R_5$, $R_6$, $R_7$, $R_8$, $R_9$, $R_{10}$, or $R_{11}$ in the above-described general formulae contains a diffusion resistant group, it is so selected that the total number of carbon atoms included therein is from 8 to 32 and preferably from 10 to 22. On the other hand, when it does not contain a diffusion resistant group, the total number of carbon atoms included therein is preferably not more than 15.

In the following $R_1$ to $R_{11}$, l, m and p in the above-described general formulae (II) to (XII) will be explained.

In the above-described general formula, $R_1$ represents an aliphatic group, an aromatic group, an alkoxy group or a heterocyclic group, and $R_2$ and $R_3$ each represents an aromatic group or a heterocyclic group.

The aliphatic groups represented by $R_1$ are preferably an aliphatic group containing from 1 to 22 carbon atoms, and may have substituents or not, and further, may have a branched or straight chain form or a cyclic form. Preferable substituents therefor include an alkoxy group, an aryloxy group, an amino group, an acylamino group, a halogen atom, etc. which each may further have a substituent(s). Specific examples of aliphatic groups useful for $R_1$ include an isopropyl group, an isobutyl group, a tert-butyl group, an isoamyl group, a tert-amyl group, a 1,1-dimethylbutyl group, a 1,1-dimethylhexyl group, a 1,1-diethylhexyl group, a dodecyl group, a hexadecyl group, an octadecyl group, a cyclohexyl group, a 2-methoxyisopropyl group, a 2-phenoxyisopropyl group, a 2-p-tert-butylphenoxyisopropyl group, an α-aminoisopropyl group, an α-(diethylamino)isopropyl group, an α-(succinimodo)isopropyl group, an α-(phthalimido)isopropyl group, an α-(benzenesulfonamido)isopropyl group, etc.

In the case that $R_1$, $R_2$ or $R_3$ represents an aromatic group (especially a phenyl group), it may have a substituent. Such an aryl group such as a phenyl group, etc. may be substituted with an alkyl group, an alkenyl group, an alkoxy group, an alkoxycarbonyl group, an alkoxycarbonylamino group, an aliphatic amido group, an alkylsulfamoyl group, an alkylsulfonamido group, an alkylureido group, alkyl-substituted succinimido group, etc. each containing 32 or less carbon atoms. The alkyl group therein may include an alkyl group which contains an aromatic group such as phenylene in its main chain. Further, a phenyl group represented by $R_1$, $R_2$ or $R_3$ may be substituted with an aryloxy group, an aryloxycarbonyl group, an arylcarbamoyl group, an arylamido group, an arylsulfamoyl group, an arylsulfonamido group, an arylureido group, etc., the aryl moiety of which groups each may be substituted with one or more alkyl groups wherein the number of carbon atoms is from 1 to 22 in total.

Furthermore, a phenyl group represented by $R_1$, $R_2$ or $R_3$ may be substituted with an amino group which includes an amino group substituted with a lower alkyl group having from 1 to 6 carbon atoms, a hydroxy group, a carboxy group, a sulfo group, a nitro group, a cyano group, a thiocyano group or a halogen atom.

In addition, $R_1$, $R_2$ or $R_3$ may represent a substituent formed by condensing a phenyl group and another ring, such as a naphthyl group, a quinolyl group, an isoquinolyl group, a chromanyl group, a coumaranyl group, a tetrahydronaphthyl group, etc. These substituents may further have substituents in themselves.

In the case that $R_1$ represents an alkoxy group, the alkyl moiety thereof represents a straight chain or branched chain alkyl group having from 1 to 32 carbon atoms, preferably from 1 to 22 carbon atoms, an alkenyl group, a cyclic alkyl group or a cyclic alkenyl group, which each may be substituted with a halogen atom, an aryl group, an alkoxy group, etc.

In the case that $R_1$, $R_2$ or $R_3$ represents a heterocyclic group, the heterocyclic group is connected to the carbon atom of the carbonyl group of the acyl moiety or the nitrogen atom of the amido moiety of an α-acylacetamido group through one of the carbon atoms forming the ring. Examples of such heterocyclic rings include thiophene, furan, pyran, pyrrole, pyrazole, pyridine, pyrazine, pyrimidine, pyridazine, indolizine, imidazole, thiazole, oxazole, triazine, thiadiazine, oxazine, etc. These rings may further have substituents on the individual rings.

In the above-described general formula (IV), $R_5$ represents a straight chain or branched chain alkyl group having from 1 to 32 carbon atoms, preferably from 1 to 22 carbon atoms (e.g., a methyl group, an isopropyl group, a tert-butyl group, a hexyl group, a dodecyl group, etc.), an alkenyl group (e.g., an allyl group, etc.), a cyclic alkyl group (e.g., a cyclopentyl group, a cyclohexyl group, a norbornyl group, etc.), an aralkyl group (e.g., a benzyl group, a β-phenylethyl group, etc.), a cyclic alkenyl group (e.g., a cyclopentenyl group, a cyclohexenyl group, etc.), etc., which groups each may be substituted with a halogen atom, a nitro group, a cyano group, an aryl group, an alkoxy group, an aryloxy group, a carboxy group, an alkylthiocarbonyl group, an arylthiocarbonyl group, an alkoxycarbonyl group, an aryloxycarbonyl group, a sulfo group, a sulfamoyl group, a carbamoyl group, an acylamino group, a diacylamino group, a ureido group, a urethane group, a thiourethane group, a sulfonamido group, a heterocyclic group, an arylsulfonyl group, an alkylsulfonyl group, an arylthio group, an alkylthio group, an alkylamino group, a dialkylamino group, an anilino group, an N-arylanilino group, an N-alkylanilino group, an N-acylanilino group, a hydroxy group, a mercapto group, etc.

$R_5$ may further represent an aryl group (e.g., a phenyl group, an α- or β-naphthyl group, etc.). The aryl group may have one or more substituents. Specific examples of the substituents include an alkyl group, an alkenyl group, a cyclic alkyl group, an aralkyl group, a cyclic alkenyl group, a halogen atom, a nitro group, a cyano group, an aryl group, an alkoxy group, an aryloxy group, a carboxy group, an alkoxycarbonyl group, an aryloxycarbonyl group, a sulfo group, a sulfamoyl group, a carbamoyl group, an acylamino group, a diacylamino group, a ureido group, a urethane group, a sulfonamido group, a heterocyclic group, an arylsulfonyl group, an alkylsulfonyl group, an arylthio group, an arkylthio group, an alkylamino group, a dialkylamino group, an anilino group, an N-alkylanilino group, an N-arylanilino group, an N-acylanilino group, a hydroxy group, a mercapto group, etc. The more preferable group for $R_5$ is a phenyl group which is substituted with an alkyl group, an alkoxy group, a halogen atom, etc. in at least one of the o-positions, because it is effective to restrain coloration of couplers remaining in the film layers due to light or heat.

Furthermore, $R_5$ may represent a heterocyclic group (e.g., a 5-membered or 6-membered heterocyclic ring containing as a hetero atom, a nitrogen atom, an oxygen atom or a sulfur atom, or a condensed ring thereof, with specific examples including a pyridyl group, a quinolyl group, a furyl group, a benzothiazolyl group, an oxazolyl group, an imidazolyl group, a naphthoxazolyl group, etc.), a heterocyclic group substituted with one or more substituents as defined for the above-described aryl group, an aliphatic acyl group, an aromatic acyl group, an alkylsulfonyl group, an arylsulfonyl group, an alkylcarbamoyl group, an arylcarbamoyl group, an alkylthiocarbamoyl group or an arylthiocarbamoyl group.

In the above-described general formulae, $R_4$ represents a hydrogen atom, a straight chain or branched chain alkyl group having from 1 to 32 carbon atoms, preferably from 1 to 22 carbon atoms, an alkenyl group, a cyclic alkyl group, an aralkyl group or a cyclic alkenyl group (which each may have one or more substituents as defined for the above-described substituent $R_5$), an aryl group or a heterocyclic group (which each also may have one or more substituents as defined for the above-described substituent $R_5$), an alkoxycarbonyl group (e.g., a methoxycarbonyl group, an ethoxycarbonyl group, a stearyloxycarbonyl group, etc.), an aryloxycarbonyl group (e.g., a phenoxycarbonyl group, a naphthoxycarbonyl group, etc.), an aralkyloxycarbonyl group (e.g., a benzyloxycarbonyl group, etc.), an alkoxy group (e.g., a methoxy group, an ethoxy group, a heptadecyloxy group, etc.), an aryloxy group (e.g., a phenoxy group, a tolyloxy group, etc.), an alkylthio group (e.g., an ethylthio group, a dodecylthio group, etc.), an arylthio group (e.g., a phenylthio group, an α-naphthylthio group, etc.), carboxy group, an acylamino group (e.g., an acetylamino group, a 3-[(2,4-di-tert-amylphenoxy)acetamido]benzamido group, etc.), a diacylamino group, an N-alkylacylamino group (e.g., a N-methylpropionamido group, etc.), an N-arylacylamino group (e.g., an N-phenylacetamido group, etc.), a ureido group (e.g., a ureido group, an N-arylureido group, an N-alkylureido group, etc.), a urethane group, a thiourethane group, an arylamino group (e.g., a phenylamino group, an N-methylanilino group, a diphenylamino group, an N-acetylanilino group, a 2-chloro-5-tetradecanamidoanilino group, etc.), an alkylamino group (e.g., a n-butylamino group, a methylamino group, a cyclohexylamino group, etc.), a cycloamino group (e.g., a piperidino group, a pyrrolidino group, etc.), a heterocyclic amino group (e.g., a 4-pyridylamino group, a 2-benzoxazolylamino group, etc.), an alkylcarbonyl group (e.g., a methylcarbonyl group, etc.), an arylcarbonyl group (e.g., a phenylcarbonyl group, etc.), a sulfonamido group (e.g., an alkylsulfonamido group, an arylsulfonamido group, etc.), a carbamoyl group (e.g., an ethylcarbamoyl group, a dimethylcarbamoyl group, an N-methylphenylcarbamoyl group, an N-phenylcarbamoyl, etc.), a sulfamoyl group (e.g., an N-alkylsulfamoyl group, an N,N-dialkylsulfamoyl group, an N-arylsulfamoyl group, an N-alkyl- N-arylsulfamoyl group, an N,N-diarylsulfamoyl group, etc.), a cyano group, a hydroxy group, a mercapto group, a halogen atom or a sulfo group.

In the above-described general formulae, $R_6$ represents a hydrogen atom, or a straight chain or branched chain alkyl group having from 1 to 32 carbon atoms, preferably from 1 to 22 carbon atoms, an alkenyl group, a cyclic alkyl group, an aralkyl group or a cyclic alkenyl group, which each may have one or more substituents as defined for the above-described substituent $R_5$.

Further, $R_6$ may represent an aryl group or a heterocyclic group, which each may have one or more substituents as defined for the above-described substituent $R_5$.

Furthermore, $R_6$ may represent a cyano group, an alkoxy group, an aryloxy group, a halogen atom, a carboxy group, an alkoxycarbonyl group, an aryloxycarbonyl group, an acyloxy group, a sulfo group, sulfamoyl group, a carbamoyl group, an acylamino group, a diacylamino group, a ureido group, a urethane group, a sulfonamido group, an arylsulfonyl group, an alkylsulfonyl group, an arylthio group, an alkylthio group, an alkylamino group, a dialkylamino group, an anilino group, an N-arylanilino group, an N-alkylanilino group, an N-acylanilino group, a hydroxy group or a mercapto group.

In the above-described general formulae, $R_7$, $R_8$ and $R_9$ each represents a group which has been employed in conventional 4-equivalent type phenol or a α-naphthol couplers. Specifically, $R_7$ represents a hydrogen atom, a halogen atom, an alkoxycarbonylamino group, an aliphatic hydrocarbon residue, an N-arylureido group, an acylamino group, an —O—$R_{12}$ group or an —S—$R_{12}$ group (wherein $R_{12}$ is an aliphatic hydrocarbon residue). When two or more of $R_7$'s are present in one molecule, they may be different from each other. The above-described aliphatic hydrocarbon residues include those having substituents. In the case that these substituents include an aryl group, the aryl group may have one or more substituents as defined for the above-described substituent $R_5$.

$R_8$ and $R_9$ each represents an aliphatic hydrocarbon residue, an aryl group or a heterocyclic group. Either of them may be a hydrogen atom. The above-described groups for $R_8$ and $R_9$ may further have certain substituents as described below. Furthermore, $R_8$ and $R_9$ may combine with each other and form a nitrogen-containing heterocyclic nucleus.

More specifically, the above-described aliphatic hydrocarbon residue includes both saturated and unsaturated ones, which each may have a straight chain form, a branched chain form or a cyclic form. Preferred examples thereof include an alkyl group (e.g., a methyl group, an ethyl group, a propyl group, an isopropyl group, a butyl group, a tert-butyl group, an isobutyl group, a dodecyl group, an octadecyl group, a cyclobutyl group, a cyclohexyl group, etc.) and an alkenyl group (e.g., an allyl group, an octenyl group, etc.). The above-described aryl group includes a phenyl group, a naphthyl group, etc. Representatives of the above-described heterocyclic group include a pyridinyl group, a quinolyl group, a thienyl group, a piperidyl group, an imidazolyl group, etc. These aliphatic hydrocarbon residues, aryl groups and heterocyclic groups each may be substituted with a halogen atom, a nitro group, a hydroxy group, a carboxy group, an amino group, a substituted amino group, a sulfo group, an alkyl group, an alkenyl group, an aryl group, a heterocyclic group, an alkoxy group, an aryloxy group, an arylthio group, an arylazo group, an acylamino group, a carbamoyl group, an ester group, an acyl group, an acyloxy group, a sulfonamido group, a sulfamoyl group, a sulfonyl group, a morpholino group, etc.

In the above-described general formulae, l represents an integer of 1 to 4, preferably 1 to 3, m represents an integer of 1 to 3, preferably 1 to 2, and p represents an integer of 1 to 5 preferably 1 to 2.

In the above-described general formula, $R_{10}$ represents an arylcarbonyl group, an alkanoyl group having from 2 to 32 carbon atoms, preferably from 2 to 22 carbon atoms, an arylcarbamoyl group, an alkanecarbamoyl group having from 2 to 32 carbon atoms, preferably from 2 to 22 carbon atoms, an alkoxycarbonyl group having from 1 to 32 carbon atoms, preferably from 1 to 22 carbon atoms or an aryloxycarbonyl group, which each may be substituted. Examples of the substituents include an alkoxy group, an alkoxycarbonyl group, an acylamino group, an alkylsulfamoyl group, an alkylsulfonamido group, an alkylsuccinimido group, a halogen atom, a nitro group, a carboxy group, a nitrile group, an alkyl group, an aryl group, etc.

In the above-described general formula, $R_{11}$ represents an arylcarbonyl group, an alkanoyl group having from 2 to 32 carbon atoms, preferably from 2 to 22 carbon atoms, an arylcarbamoyl group, an alkanecarbamoyl group having from 2 to 32 carbon atoms, preferably from 2 to 22 carbon atoms, an alkoxycarbonyl group having from 1 to 32 carbon atoms, preferably from 1 to 22 carbon atoms, an aryloxycarbonyl group, an alkanesulfonyl group having from 1 to 32 carbon atoms, preferably from 1 to 22 carbon atoms, an arylfulfonyl group, an aryl group or a 5-membered or 6-membered heterocyclic group (containing as a hetero atom, a nitrogen atom, an oxygen atom or a sulfur atom, with specific examples including a triazolyl group, an imidazolyl group, a phthalimido group, a succinimido group, a furyl group, a pyridyl group, a benzotriazolyl group, etc.), which each may have one or more substituents as defined for the above-described substituent $R_{10}$.

As described above, when A in the general formula (I) has a diffusion resistant group, a diffusion resistant colored or colorless compound is formed after the coupling reaction with the oxidation product of an aromatic primary amine developing agent, and when A has a non-diffusion resistant group, a compound which has a diffusibility corresponding to the non-diffusion resistant group contained in A is formed. Further, when A has an alkali solubilizing group, a compound formed upon the coupling reaction flows out from the film.

The compound represented by the general formula (I) according to the present invention includes a polymer coupler. More specifically, it includes a polymer which is derived from a monomer coupler represented by general formula (XIV) described below and which contains a repeating unit represented by general formula (XV) described below, and a copolymer of the monomer coupler represented by general formula (XIV) described below and at least one kind of a non-color forming unit containing at least one ethylene group which does not have the ability to couple with the oxidation product of an aromatic primary amine developing agent. In such cases, two or more kinds of the monomer couplers may be polymerized together.

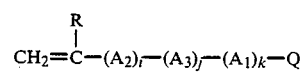

(XIV)

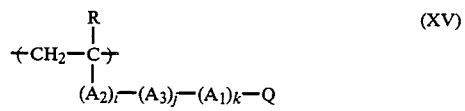

(XV)

wherein R represents a hydrogen atom, a lower alkyl group containing 1 to 4 carbon atoms or a chlorine atom; $A_1$ represents —CONH—, —NHCONH—, —NHCOO—, —COO—, —$SO_2$—, —CO—, —NHCO—, —$SO_2$NH—, —NH$SO_2$—, —OCO—, —OCONH—, —NH— or —O—; $A_2$ represents —CONH— or —COO—; $A_3$ represents an unsubstituted or substituted alkylene group having from 1 to 10 carbon atoms which may be a straight chain or a branched chain, an aralkylene group or an unsubstituted or substituted arylene group; Q represents a residue of the compound represented by the general formula (I) which may be bonded at any portion of A and Dye; and i, j and k each represents 0 or 1, provided that all of i, j and k are not 0 at the same time.

Examples of the alkylene group represented by $A_3$ include a methylene group, a methyl methylene group, a dimethylmethylene group, a dimethylene group, a trimethylene group, a tetramethylene group, a pentamethylene group, a hexamethylene group, a decylmethylene group, etc. Examples of the aralkylene group include a benzylidene group, etc. Examples of the arylene group include a phenylene group, a naphthylene group, etc.

The substituent for the alkylene group, aralkylene group or arylene group represented by $A_3$ includes an aryl group (for example, a phenyl group, etc.), a nitro group, a hydroxy group, a cyano group, a sulfo group, an alkoxy group (for example, a methoxy group, etc.), an aryloxy group (for example, a phenoxy group, etc.), an acyloxy group (for example, an acetoxy group, etc.), an acylamino group (for example, an acetylamino group, etc.), a sulfonamido group (for example, a methanesulfonamido group, etc.), a sulfamoyl group (for example, a methylsulfamoyl group, etc.), a halogen atom (for example, a fluorine atom, a chlorine atom, a bromine atom, etc.), a carboxy group, a carbamoyl group (for example, a methylcarbamoyl group, etc.), an alkoxycarbonyl group (for example, a methoxycarbonyl group, etc.), a sulfonyl group (for example, a methylsulfonyl group, etc.), and the like. When two or more substituents are present, they may be the same or different.

Examples of the non-color forming ethylenic monomer which does not couple with the oxidation product of an aromatic primary amine developing agent include an acrylic acid such as acrylic acid, α-chloroacrylic acid, and α-alkylacrylic acid, etc., an ester or amide derived from an acrylic acid, methylenebisacrylamide, a vinyl ester, an acrylonitrile, an aromatic vinyl compound, a maleic acid derivative, a vinyl pyridine, etc. Two or more of the non-color forming ethylenically unsaturated monomers can be used together with.

It is preferred that A in general formula (I) represents a coupler residue which forms a dye upon the coupling reaction with the oxidation product of a developing agent and color of the dye is substantially the same as that of X-Dye and which does not contain a diffusion resistant group having 10 or more carbon atoms.

It is further preferred that A represents a coupler residue which has a water solubilizing group (such as a carboxy group or a sulfo group) as a substituent and which forms a dye capable of flowing out from the light-sensitive material after the coupling reaction with the oxidation product of a developing agent.

In the general formula (I), X-Dye is preferably a group represented by the following general formula (XIII):

wherein X has the same meaning as defined in the general formula (I); Y represents an atomic group which contains at least one unsaturated bond having the conjugated relationship with the azo group and which is connected to X through the atom constituting the above described unsaturated bond; Z represents an atomic group containing at least one unsaturated bond capable of conjugating with the azo group; and a total number of the carbon atoms included in Y and Z is 10 or more.

In the general formula (XIII), X is preferably an oxygen atom or a sulfur atom.

In the general formula (XIII), each of Y and Z is preferably an aromatic group or an unsaturated heterocyclic group. For the aromatic group, a substituted or unsubstituted phenyl group or a substituted or unsubstituted naphthyl group is preferred. For the unsaturated heterocyclic group, a 4-membered to 7-membered heterocyclic group containing at least one hetero atom selected from a nitrogen atom, a sulfur atom and an oxygen atom is preferred and a condensed ring thereof with a benzene may be used. Examples of the heterocyclic groups include a group having a ring structure, for example, pyrrole, thiophene, furan, imidazole, 1,2,4-triazole, oxazole, thiadiazole, pyridine, indole, benzothiophene, benzimidazole or benzoxazole, etc.

Y may have a substituent in addition to X and the azo group. Examples of the substituents include an aliphatic group, an aromatic group, an acyl group, an alkoxycarbonyl group, an aryloxycarbonyl group, an acylamino group, an alkylthio group, an arylthio group, a heterocyclic group, a sulfonyl group, a halogen atom, a nitro group, a nitroso group, a cyano group, a carboxyl group, a hydroxy group, a sulfonamido group, an alkoxy group, an aryloxy group, an acyloxy group, a carbamoyl group, an amino group, a ureido group, a sulfamoyl group, a carbamoyl group or a hydrazinyl group, etc. These substituents may be further substituted.

When Z represents a substituted aromatic group or a substituted unsaturated heterocyclic group, the substituent may be selected from those as defined for the above described Y.

When Y or Z includes an aliphatic group portion as a substituent, it may be an aliphatic group having from 1 to 32 carbon atoms and preferably from 1 to 20 carbon atoms and may be substituted or unsubstituted, saturated or unsaturated, and a straight chain, branched chain or cyclic form.

When Y or Z includes an aromatic group portion as a substituent, it may contain from 6 to 10 carbon atoms and is preferably a substituted or unsubstituted phenyl group.

Of the groups represented by the general formula (XIII), the following groups are preferred.

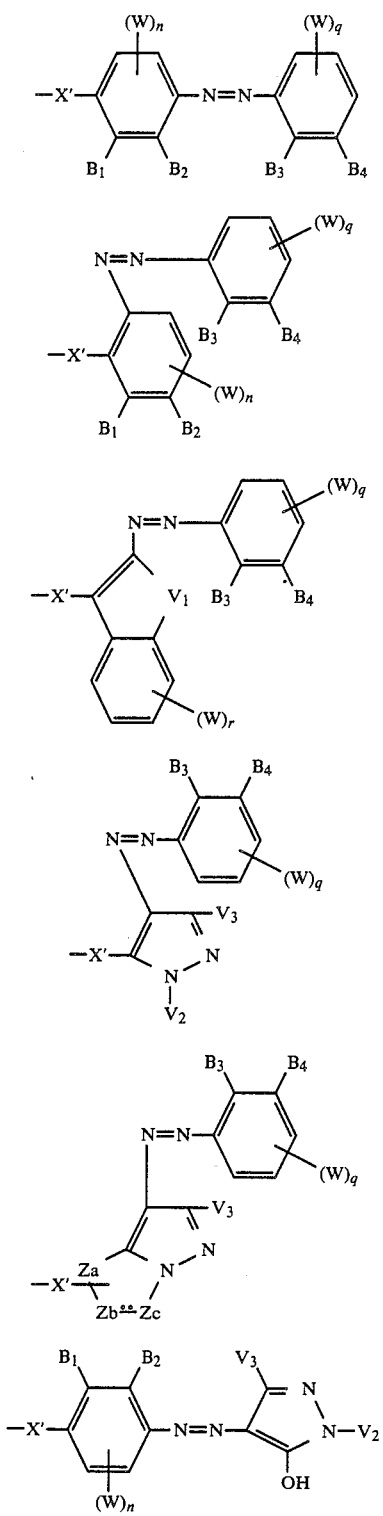

wherein X' represents an oxygen atom or a sulfur atom; W represents a substituent selected from the substituents defined for Y and Z in the general formula (XIII); n represents 0, 1 or 2; q represents 0, 1, 2 or 3; r represents 0, 1, 2, 3 or 4; $B_1$, $B_2$, $B_3$ and $B_4$ each represents a hydrogen atom or a substituent as defined for W, or $B_1$ and $B_2$ or $B_3$ and $B_4$ may be bonded each other to form a condensed ring on the benzene.

In the general formula (D-1) to (D-6), an oxygen atom is preferred for X'. When $B_1$ and $B_2$ or $B_3$ and $B_4$ form the condensed benzene ring, the condensed ring portion may be substituted with a substituent as defined for W. In the above described general formulae, when n, q or r represents an integer of 2 or more, these W's may be the same or different.

In the general formula (D-1) to (D-6), $V_1$ represents a sulfur atom, an oxygen atom or an imino group which may have a substituent.

$V_2$ represents an aliphatic hydrocarbon group, an aryl group or a heterocyclic group. When $V_2$ represents an aliphatic hydrocarbon group, which may be saturated or unsaturated and a straight chain, branched chain or cyclic form. Preferred examples of the aliphatic hydrocarbon groups include an alkyl group having from 1 to 22 carbon atoms (for example, a methyl group, an ethyl group, an isopropyl group, a butyl group, a dodecyl group, an octadecyl group, a cyclohexyl group, etc.), and an alkenyl group (for example, an allyl group, an octenyl group, etc.). Preferred examples of the aryl groups include a phenyl group and a naphthyl group. Preferred examples of the heterocyclic groups include a pyridyl group, a quinolyl group, a thienyl group, a piperidyl group, an imidazolyl group, etc.

Examples of the substituents for the aliphatic hydrocarbon group, aryl group and the heterocyclic group are those as defined for Y in the above described general formula (VIII).

$V_3$ represents a straight chain or branched chain alkyl group having from 1 to 32 carbon atoms, and preferably from 1 to 22 carbon atoms, an alkenyl group, a cycloalkyl group, an aralkyl group, a cycloalkenyl group, an aryl group, a heterocyclic group, an alkoxycarbonyl group (for example, a methoxycarbonyl group, a stearyloxycarbonyl group, etc.), an aryloxycarbonyl group (for example, a phenoxycarbonyl group, a naphthoxycarbonyl group, etc.), an aralkyloxycarbonyl group (for example, a benzyloxycarbonyl group, etc.), an alkoxy group (for example, a methoxy group, an ethoxy group, a heptadecyloxy group, etc.), an aryloxy group (for example, a phenoxy group, a tolyloxy group, etc.), an acylamino group (for example, an acetylamino group, a 3-[2,4-di-tert-amylphenoxy)acetamido]benzamido group, etc.), a diacylamino group, an N-alkylacylamino group (for example, an N-methylpropionamido group, etc.), an N-arylacylamino group (for example, an N-phenylacetamido group, etc.), a ureido group (for example, a ureido group, an N-arylureido group, an N-alkylureido group, etc.), an alkylamino group (for example, a n-butylamino group, a methylamino group, a cyclohexylamino group, etc.), a cycloamino group (for example, a piperidino group, a pyridino group, etc.), or a sulfonamido group (for example, an alkylsulfonamido group, an arylsulfonamido group, etc.). These groups may further have a substituent selected from those as defined for Y in the above described general formula (VIII).

$V_3$ further represents a halogen atom (for example, a chlorine atom, a bromine atom, etc.) or a cyano group.

Za, Zb and Zc each represents a methine group, a substituted methine group, =N— or —NH—, and one of the Za–Zb bond and Zb–Zc bond is a double bond and the other is a single bond, provided that all of Za, Zb and Zc do not represents N at the same time. When the Zb–Zc bond represents a carbon-carbon double bond, it may constitute a part of the aromatic ring, and the aromatic ring may have a substituent as defined for Y above.

Further, any one of Za, Zb and Zc is bonded to X' to form a connection of —X'—C=.

In the general formula (I), it is preferred that a total number of the carbon atoms included in X-Dye is from 20 to 40.

Further, in the general formula (I), X-Dye which does not contain a carboxy group or a sulfo group as a substituent is preferred.

The dye (X-Dye) formed from the compound represented by the general formula (I) is preferred to be utilized as an image forming agent in the layer to which the compound is added or an adjacent layer thereto.

A layer to which the above described coupler according to the present invention can be added is a light-sensitive silver halide containing layer or an adjacent layer thereto.

It is preferred that the above described coupler is incorporated into a light-sensitive silver halide emulsion layer and a light-sensitive area of the emulsion layer and color image formed with X-Dye are substantially in a complementary relationship.

Specific examples of the compounds which can be used in the present invention are set forth below, but the present invention should not be construed as being limited thereto.

Examples of the compound which recovers a yellow dye upon the cleavage of the bond between A and X in the general formula (I):

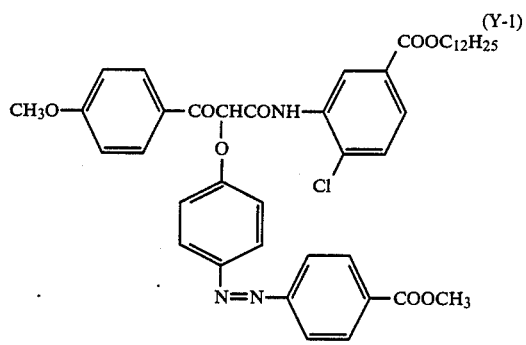
(Y-1)

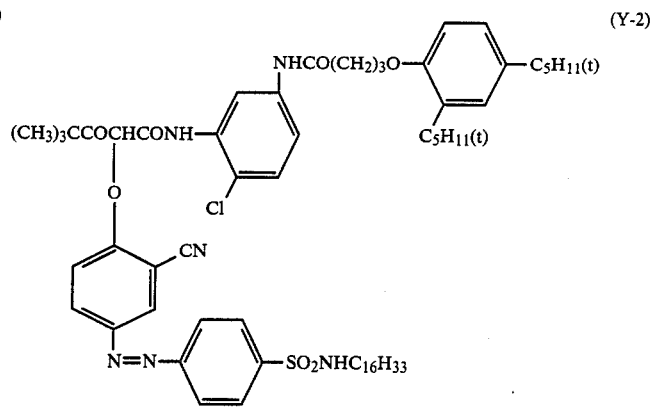
(Y-2)

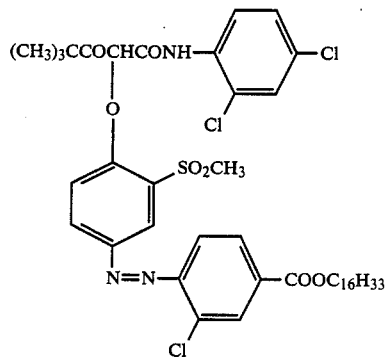
(Y-3)

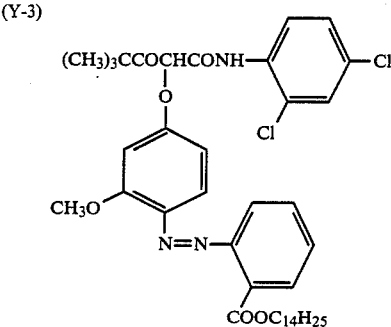
(Y-4)

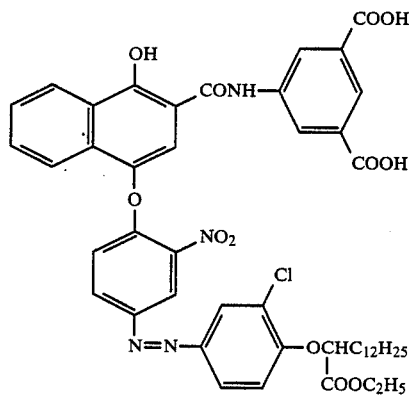
(Y-5)

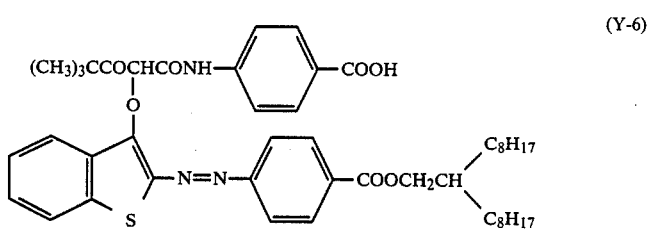
(Y-6)

-continued
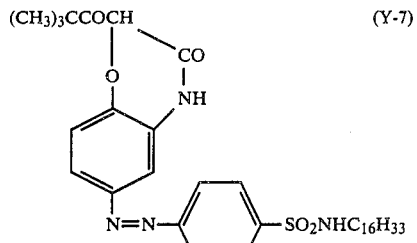 (Y-7)
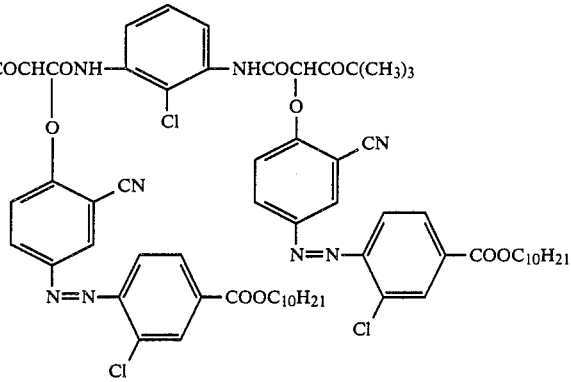 (Y-8)
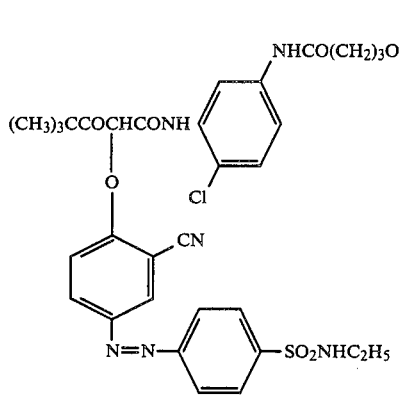 (Y-9)
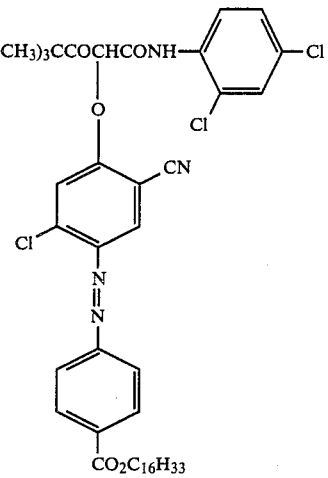 (Y-10)
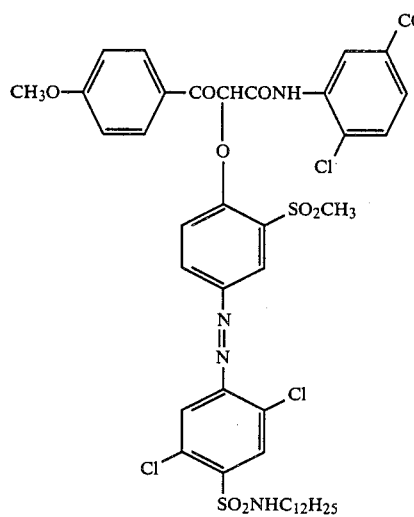 (Y-11)
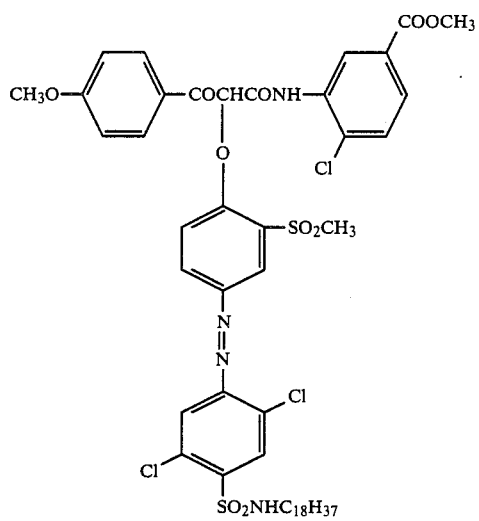 (Y-12)

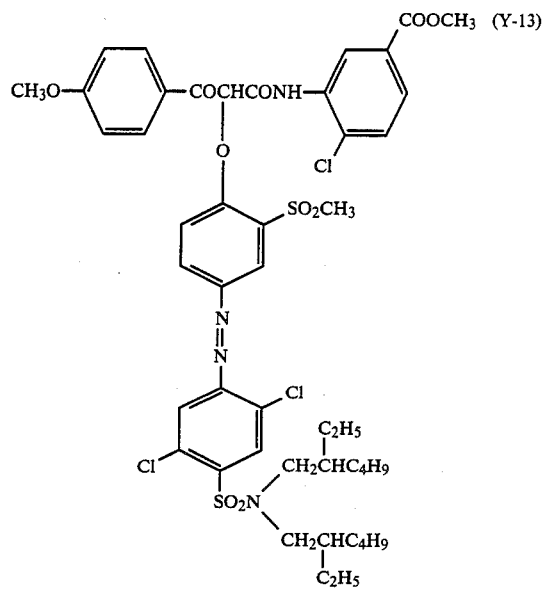
(Y-13)
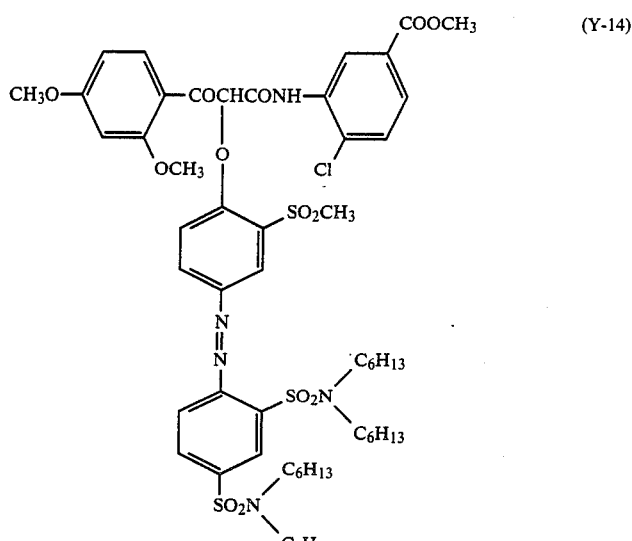
(Y-14)
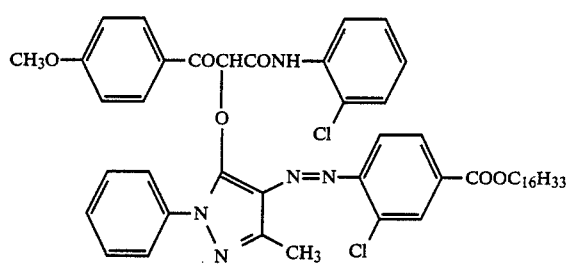
(Y-15)
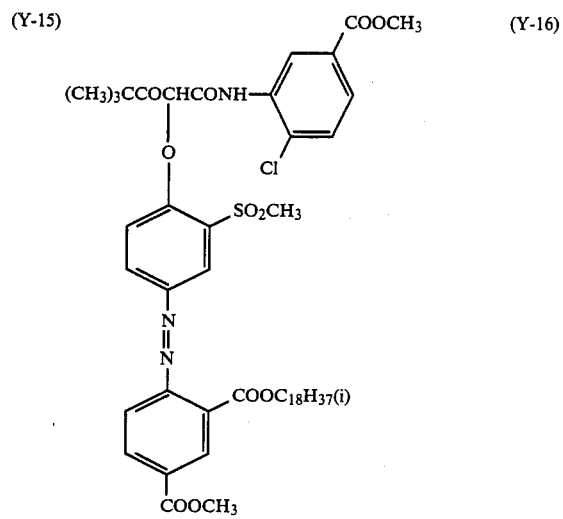
(Y-16)
Examples of the compound which recovers a magenta dye upon the cleavage of the bond between A and X in the general formula (I):
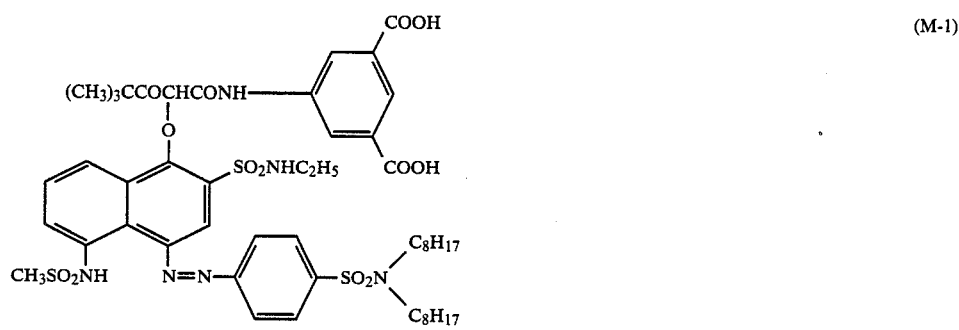
(M-1)

-continued
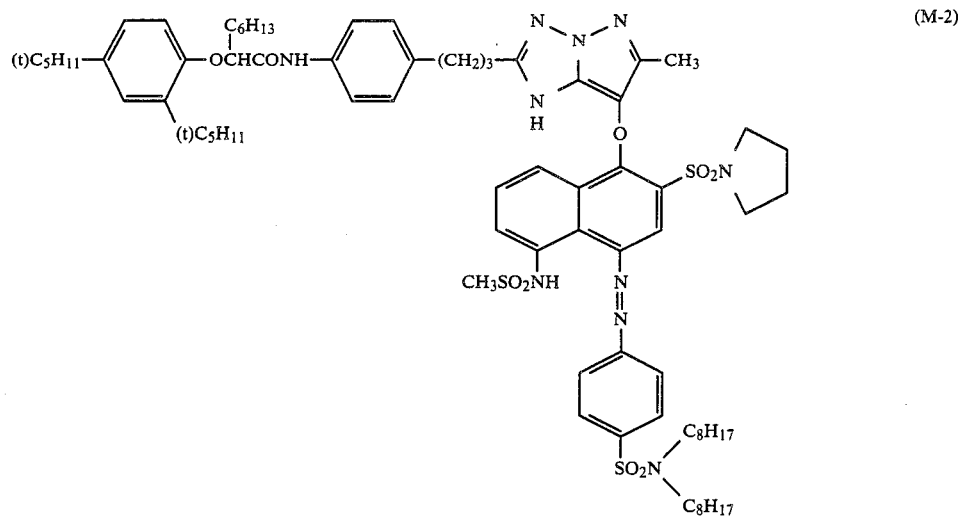
(M-2)
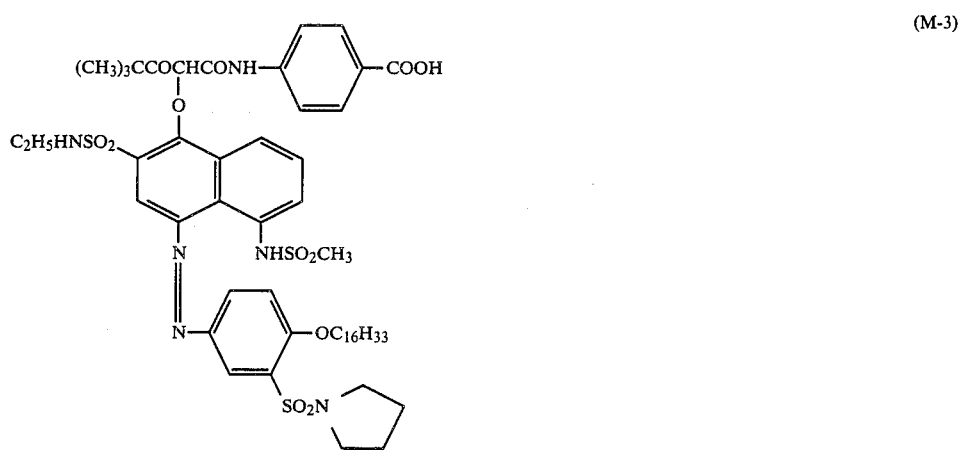
(M-3)
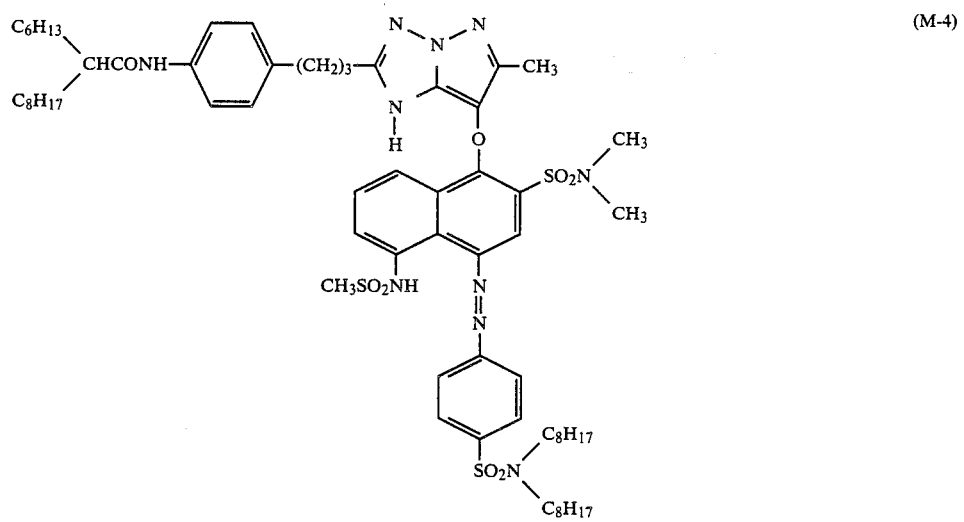
(M-4)

-continued
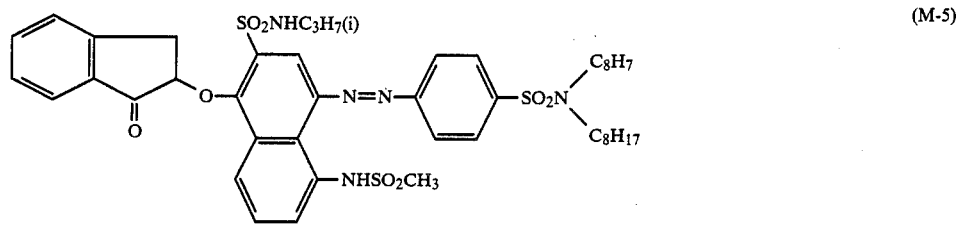 (M-5)
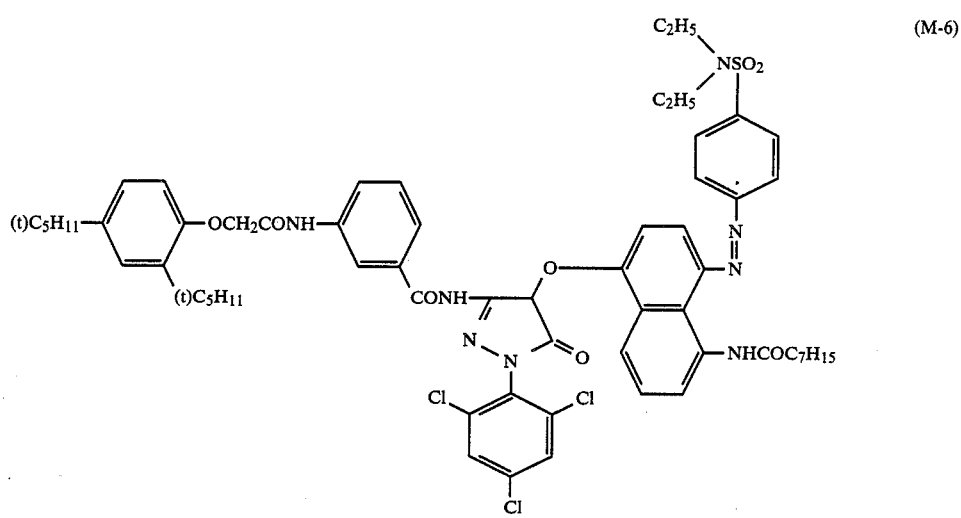 (M-6)
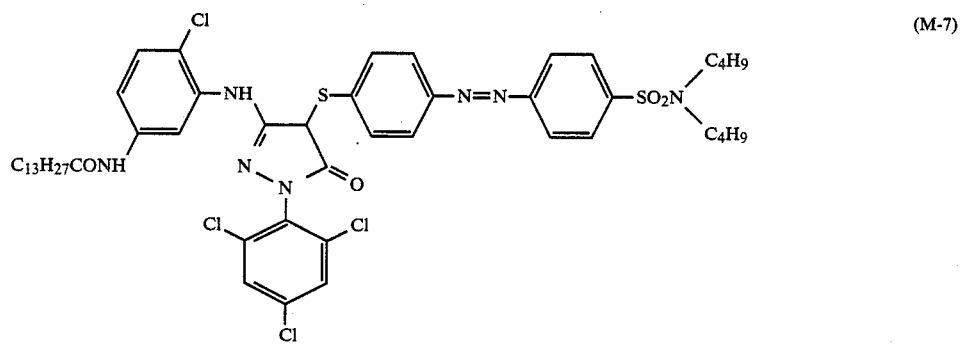 (M-7)
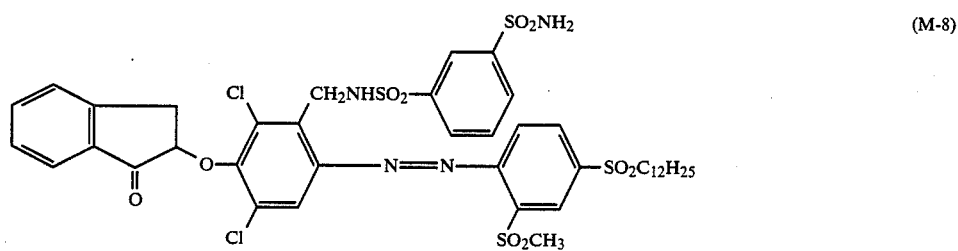 (M-8)

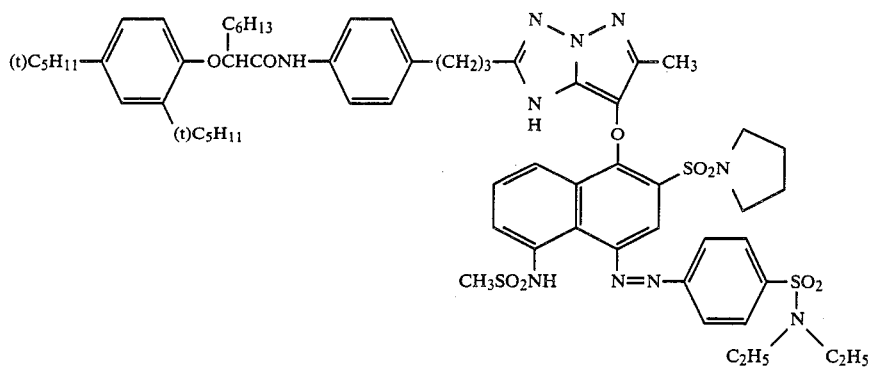
(M-9)
Examples of the compound which recovers a cyan dye upon the cleavage of the bond between A and X in the general formula (I):
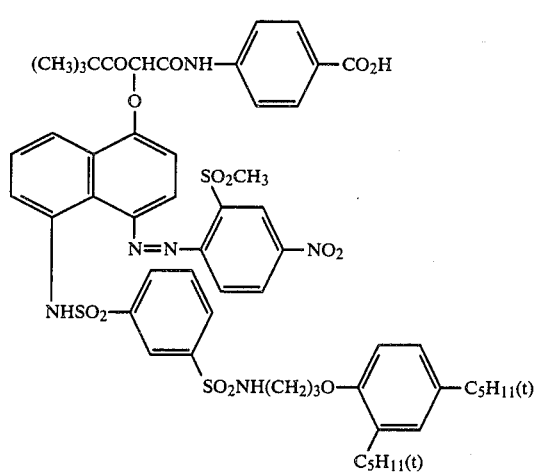
(C-1)
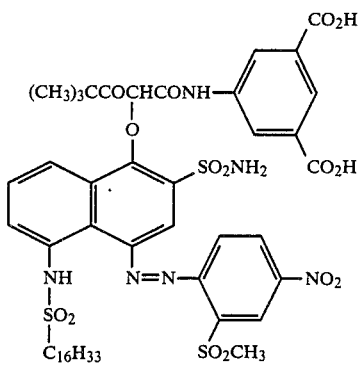
(C-2)
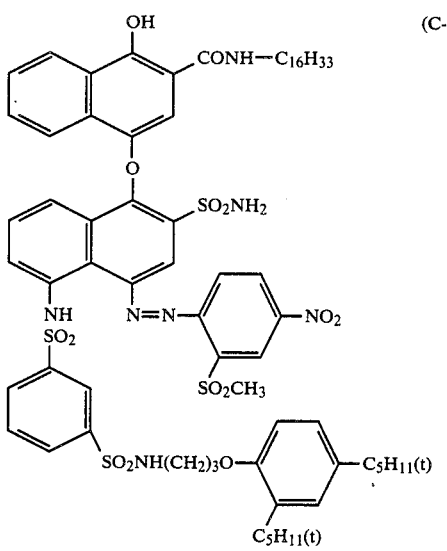
(C-3)
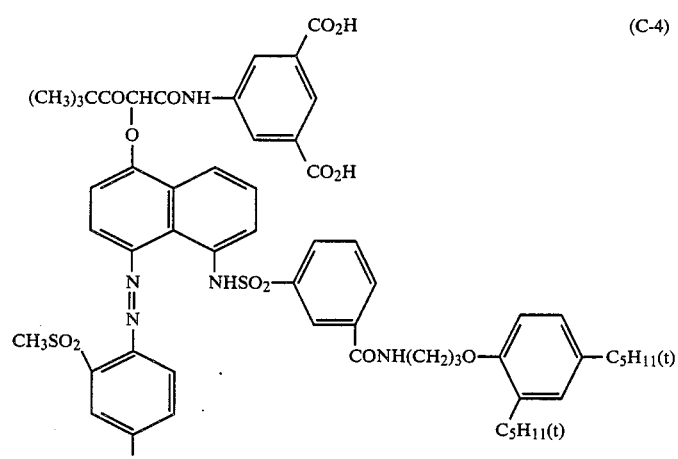
(C-4)

(C-5)

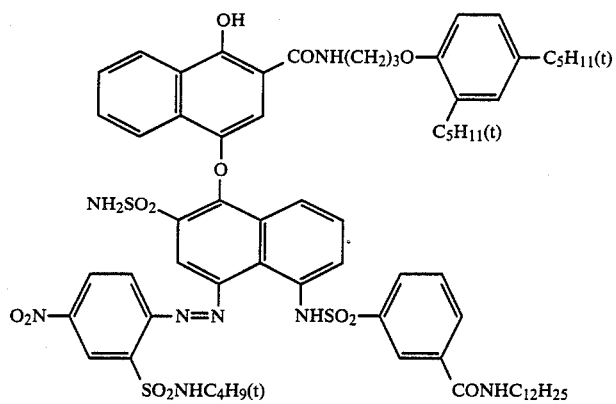

(C-6)

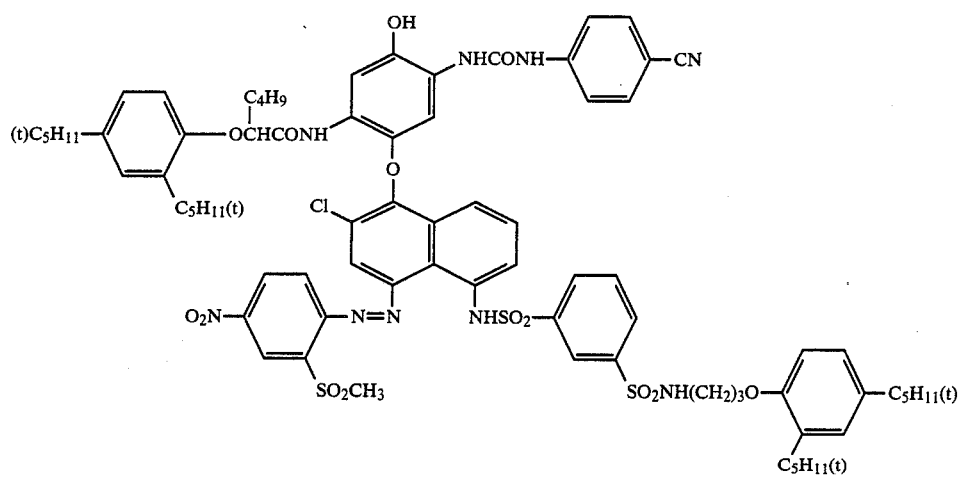

(C-7)

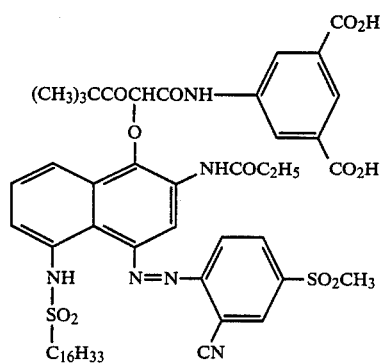

(C-8)

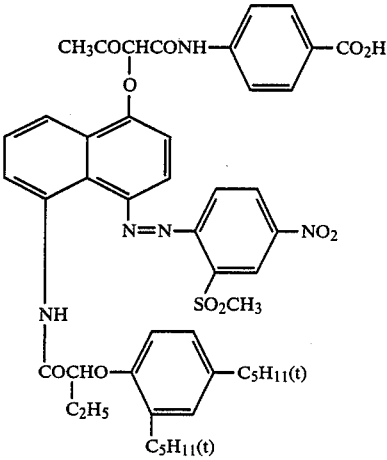

In the following, synthesis examples of the compounds according to the present invention are specifically described.

SYNTHESIS EXAMPLE 1

Synthesis of Compound (Y-2)

A mixture of 30 g of α-pivaloyl-α-chloro-2-chloro-5-[γ-(2,4-di-tert-amylphenoxy)butyramido]acetanilide, 30 g of 2-cyano-4-(4-hexadecylsulfamoyl phenylazo)-phenol, 8 g of triethylamine and 200 ml of acetonitrile was refluxed by heating. After reacting for 5 hours, 500 ml ethyl acetate was added to the reaction solution. The mixture was washed with 1 liter of water, then washed with diluted hydrochloric acid and thereafter repeatedly washed with water until the washed liquid became neutral. The oil layer separated was dried with anhydrous sodium sulfate and the solvent was distilled off under a reduced pressure. The residue thusobtained was crystallized using a solvent mixture of n-hexane and ethyl acetate (1/10 in volume ratio) to obtain 14.5 g of the desired Compound (Y-2).

SYNTHESIS EXAMPLE 2

Synthesis of Compound (M-2)

Compound (M-2) was synthesized according to the following reaction scheme:

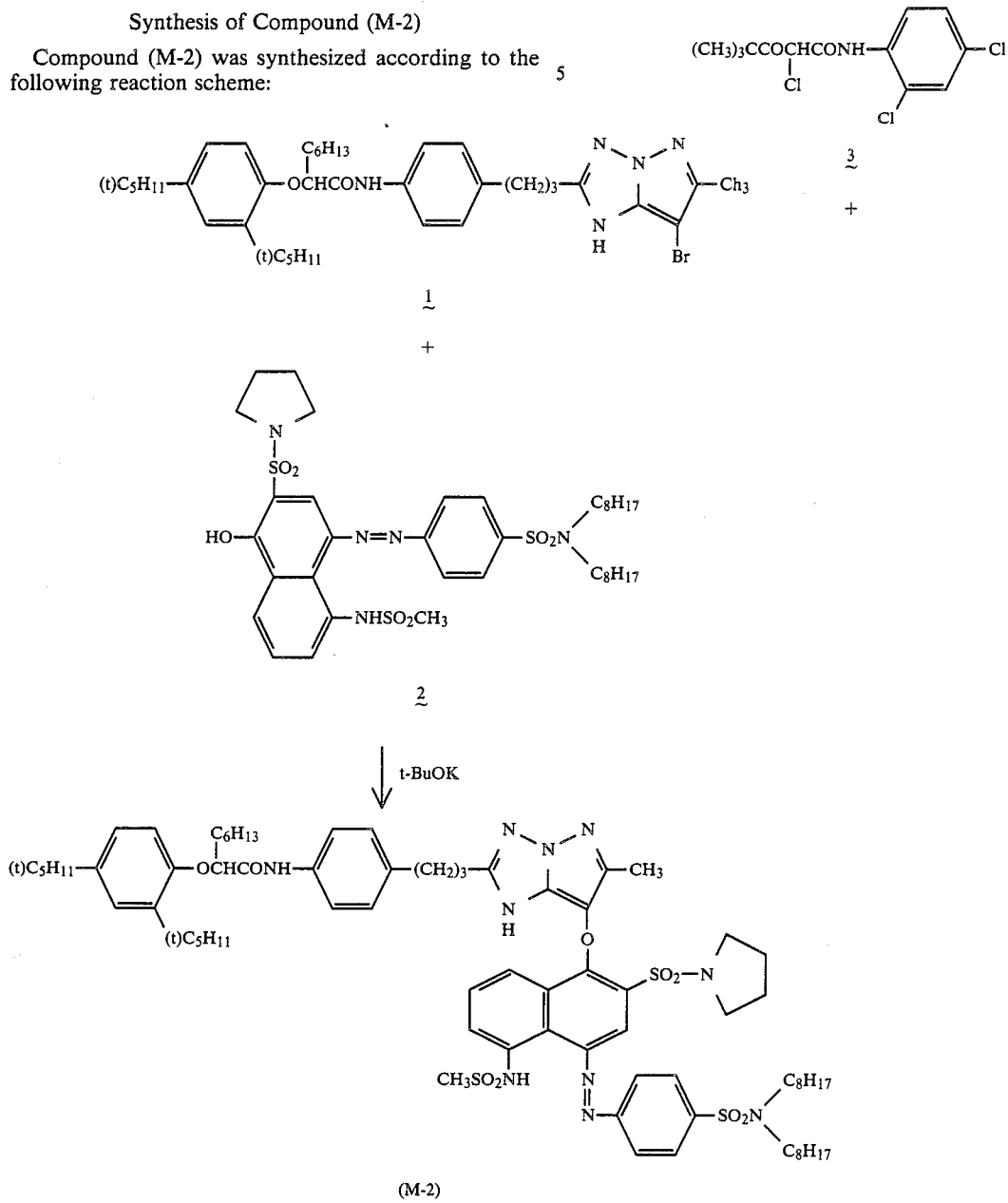

A mixture of 17.3 g of Compound 1, 23.4 g of Compound 2, 3.4 g of potassium tert-butoxide and 200 ml of N,N-dimethylacetamide was heated at 120° C. for 5 hours. The reaction solution was cooled to room temperature, to which was added 1 liter of ethyl acetate. The mixture was washed with 1 liter of water, neutralized with diluted hydrochloric acid and then washed with 1 liter of water. The oil layer separated was dried with anhydrous sodium sulfate and the solvent was distilled off. The residue thus-obtained was purified using silica gel chromatography to obtain 14.3 g of the desired Compound (M-2).

SYNTHESIS EXAMPLE 3

Synthesis of Compound (Y-10)

Compound (Y-10) was synthesized according to the following reaction scheme:

-continued

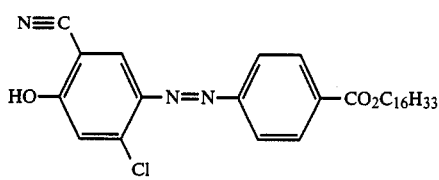

4

↓ DBU

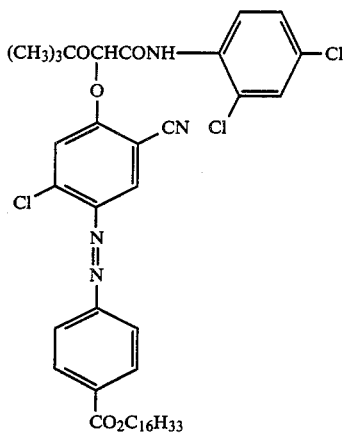

(Y-10)

10.5 g (0.02 mol) of Compound 4 was dissolved in 300 ml of desiccated tetrahydrofuran (THF) and to the solution was added 6.1 g (0.04 mol) of 1,8-diazabicyclo [5, 4, 0]undecene-7 (DBU). After stirring at room temperature for 30 minutes, a solution containing 6.42 g (0.02 mol) of Compound 3 dissolved in 50 ml of tetrahydrofuran (THF) was gradually added dropwise while refluxing the reaction solution. After the completion of the dropwise addition, the mixture was further refluxed by heating for 1 hour. After cooling, the mixture was poured into 1 liter of ice water to obtain 13.5 g of crude crystals. The crude crystals were recrystallized from a solvent mixture of acetonitrile and ethyl acetate (5/1 in volume ratio) to obtain 8.7 g of the desired Compound (Y-10).

SYNTHESIS EXAMPLE 4

Synthesis of Compound (M-8)

Compound (M-8) was synthesized according to the following reaction scheme:

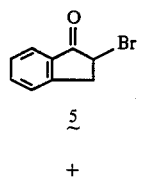

5

+

-continued

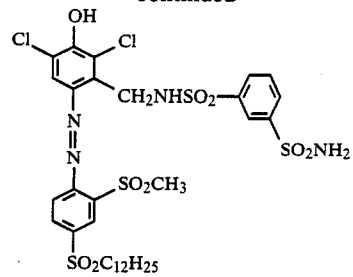

6

↓ DMF/THF

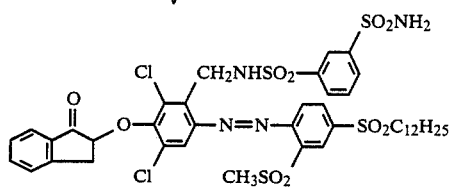

(M-8)

16.4 g (0.02 mol) of Compound 6 was dissolved in 400 ml of a desiccated solvent mixture of dimethylformamide (DMF) and tetrahydrofuran (THF) (1/1 in volume ratio) and the solution was stirring under cooling with an ice bath. 2.24 g (0.02 mol) of potassium tert-butoxide was added to the solution and stirred at room temperature. A solution containing 4.2 g (0.02 mol) of Compound 5 dissolved in 50 ml of dimethylformamide (DMF) was gradually added to the mixture at room temperature. The mixture was stirred for 1.5 hours and then poured into 1.5 liters of ice water to obtain 15.2 g of crude crystals. The crude crystals were separated and purified using column chromatography to obtain 7.9 g of the desired Compound (M-8).

The compound according to the present invention can be used in an amount of a range from 0.005 mol to 0.5 mol, preferably from 0.01 mol to 0.3 mol per mol of silver.

The same or different photographic emulsion layers or light-insensitive layers of the photographic material of the present invention can be incorporated, in addition to the compounds represented by the general formula (I) described above, with other dye forming couplers, i.e., compounds capable of forming color upon oxidative coupling with aromatic primary amine developing agents (e.g., phenylenediamine derivatives, aminophenol derivatives, etc.) during the course of color development processing. Examples of such couplers include magenta couplers, such as 5-pyrazolone couplers, pyrazolobenzimidazole couplers, pyrazolotriazole couplers, pyrazoloimidazole couplers, pyrazolopyrazole couplers, pyrazolotetrazole couplers, cyanoacetylcoumarone couplers and open chain acylacetonitrile couplers, etc.; yellow couplers, such as acylacetamide couplers (e.g., benzoylacetanilides, pivaloylacetanilides, etc.), etc.; and cyan couplers, such as naphthol couplers and phenol couplers, etc. It is preferable to use non-diffusible couplers containing a hydrophobic group (so-called ballast group) within the molecules or polymeric couplers. They may be either 4-equivalent or 2-equivalent with respect to silver ions. These couplers are preferably employed at a ratio of 0 mol % more preferably 0 mol % to 30 mol % to the compounds according to the present invention.

It is also possible to use colored couplers capable of exerting color correction effects, or couplers capable of releasing development inhibitors during the course of development (so-called DIR couplers).

Examples of the DIR couplers are couplers releasing a heterocyclic mercapto series development inhibitor as described in, for example, in U.S. Pat. No. 3,227,554; couplers releasing a benzotriazole derivative as a development inhibitor as described, for example, in Japanese Patent Publication No. 9942/83; so-called non-coloring DIR couplers as described, for example, in Japanese Patent Publication No. 16141/76; couplers releasing a nitrogen-containing heterocyclic development inhibitor with the decomposition of methylol after releasing as described, for example, in Japanese Patent Application (OPI) No. 90932/77; couplers releasing a development inhibitor with an intramolecular nucleophilic reaction after releasing as described, for example, in U.S. Pat. No. 4,248,962 and Japanese Patent Application (OPI) No. 56837/82; couplers releasing a development inhibitor by an electron transfer through a covalent system after releasing as described, for example, in Japanese Patent Application (OPI) Nos. 114946/81, 154234/82, 188035/82, 98728/83, 209736/83, 209737/83, 209738/83, 209739/83, 209740/83, etc.; couplers releasing a diffusible development inhibitor the development inhibiting faculty of which is inactivated in a developer as described, for example, in Japanese Patent Application (OPI) Nos. 151944/82, 217932/83, etc.

Further, the emulsion layer may contain non-color-forming DIR coupling compounds which release a development inhibitor, the product of which formed by a coupling reaction is colorless, other than DIR couplers.

Moreover, the photographic light-sensitive material may contain compounds which release a development inhibitor during the course of development, other than DIR couplers.

Two or more kinds of the compounds according to the present invention and the above-described couplers and the like can be incorporated together in the same layer for the purpose of satisfying the properties required of the photographic light-sensitive material, or the same compound can naturally be added to two or more layers.

The present invention is also applicable to a multilayer multicolor photographic material containing layers sensitive to at least two different spectral wavelength ranges on a support. A multilayer natural color photographic material generally possesses at least one red-sensitive silver halide emulsion layer, at least one green-sensitive silver halide emulsion layer and at least one blue-sensitive silver halide emulsion layer, respectively, on a support. The order of these layers can be varied, if desired. Ordinarily, a cyan forming coupler is present in a red-sensitive emulsion layer, a magenta forming coupler is present in a green-sensitive emulsion layer and a yellow forming coupler is present in a blue-sensitive emulsion layer, respectively. However, if desired, a different combination can be employed.

Development processing of the photographic light-sensitive material used in the present invention comprises fundamentally a color developing step, a bleaching step and a fixing step. The bleaching step and the fixing step may be carried out in the same bath. Further a stabilizing step may be additionally furnished. Moreover, after a first development (black-and-white development) or a reversal development, the above described steps may be conducted. Specific processing procedures are described in *Research Disclosure*, No. 176, pages 28 to 30.

Color developing solutions are usually composed of alkaline aqueous solutions containing color developing agents. As these color developing agents, known primary aromatic amine developing agents, e.g., phenylenediamines such as 4-amino-N,N-diethylaniline, 3-methyl-4-amino-N,N-diethylaniline, 4-amino-N-ethyl-N-β-hydroxyethylaniline, 3-methyl-4-amino-N-ethyl-N-β-hydroxyethylaniline, 3-methyl-4-amino-N-ethyl-N-β-methanesulfonamidoethylaniline, 4-amino-3-methyl-N-ethyl-N-β-methylethylaniline, etc., can be used.

In addition, the compounds as described in L. F. A. Mason, *Photographic Processing Chemistry*, pages 226 to 229, Focal Press (1966), U.S. Pat. Nos. 2,193,015 and 2,592,364, Japanese Patent Application (OPI) No. 64933/73 (corresponding to U.S. Pat. No. 3,816,134), etc., may be used.

The color developing solutions can further contain pH buffering agents such as sulfite, carbonates, borates and phosphates of alkali metals, etc. developing inhibitors or anti-fogging agents such as bromides, iodides or organic anti-fogging agents, etc. In addition, if desired, the color developing solution can also contain water softeners; preservatives such as hydroxylamine, etc.; organic solvents such as benzyl alcohol, diethylene glycol, etc.; developing accelerators such as polyethylene glycol, guaternary ammonium salts, amines, etc.; dye forming couplers; competing couplers; fogging agents such as sodium borohydride, etc.; auxiliary developing agents such as 1-phenyl-3-pyrazolidone, etc.; viscosity-imparting agents; polycarboxylic acid type chelating atents; anti-oxidizing agents; and the like.

After color development, the photographic emulsion layer is usually subjected to a bleach processing. This bleach processing may be performed simultaneously with a fix processing, or they may be performed independently.

Bleaching agents which can be used include compounds of polyvalent metals, e.g., iron (III), cobalt (III), chromium (VI), and copper (II), peracids, quinones and nitroso compounds. For example, ferricyanides; dichromates; organic complex salts of iron (II) or cobalt (III), e.g., complex salts of aminopolycarboxylic acids (e.g., ethylenediaminetetraacetic acid, nitrilotriacetic acid, 1,3-diamino-2-propanoltetraacetic acid, etc.) or organic acids (e.g., citric acid, tartaric acid, malic acid, etc.); persulfates; permanganates; nitrosophenol, etc. can be used. Of these compounds, potassium ferricyanide, iron (III) sodium ethylenediaminetetraacetate, and iron (III) ammonium ethylenediaminetetraacetate are particularly useful. Ethylenediaminetetraacetic acid iron (III) complex salts are useful in both an independent bleaching solution and a mono-bath bleach-fixing solution.

Any fixing solutions which have compositions generally used can be used in the present invention. As fixing agents, thiosulfuric acid salts and thiocyanic acid salts, and in addition, organic sulfur compounds which are known to be effective as fixing agents can be used. These fixing solutions may contain water-soluble aluminum salts as hardeners.

In the processing steps of color reversal photographic light-sensitive material, a prebath, a pre-hardening bath, a neutralizing bath, etc. may be additionally included.

Further, a water-washing step after stopping, reversal, color development, control or bleaching may be omitted. A reversal step can be carried out either with a fogging bath or by re-exposure. The reversal step may be eliminated by the addition of the fogging agent into the color developing solution. Moreover it is possible to omit a control bath.

Known developing agents can be used in the first development solutions. For example, dihydroxybenzenes (e.g., hydroquinone, etc.), 3-pyrazolidones (e.g., 1-phenyl-3-pyrazolidone, etc.), aminophenols (e.g., N-methyl-p-aminophenol, etc.), 1-phenyl-3pyrazolines, ascorbic acid, heterocyclic compounds such as those in which a 1,2,3,4-tetrahydroquinoline ring and an indorene ring are condensed as described in U.S. Pat. No. 4,067,872, etc. may be used individually or in combination thereof.

Known fogging agents can be used in the fogging bath. For example, a stannous ion complex, for example, a stannous ion-organic phosphoric acid complex (as described in U.S. Pat. No. 3,617,282), a stannous ion-organic phosphonocarboxylic acid complex (as described in Japanese Patent Publication No. 32616/81 (corresponding to U.S. Pat. No. 4,162,161)), a stannous ion-aminopolycarboxylic acid complex (as described in British Pat. No. 1,209,050), etc., or a boron compound, for example, a borohydrido compound (as described in U.S. Pat. No. 2,984,567), a heterocyclic aminoborane compound (as described in British Pat. No. 1,011,000), etc. may be used.

In the color development step or the step subsequent thereto, a processing solution containing a metal ion may be used. By the processing with such a solution, the dye which is formed from the shifted dye may form its metal chelate in the photographic light-sensitive material according to the present invention. Examples of the metal ions used include copper, nickel, chromium, cobalt, manganese, zinc, etc. Examples of the dyes are described in International Published Patent Application (WO) 83/00939.

In order to incorporate the compounds according to the present invention and couplers to be used together into a silver halide emulsion layer known methods, including those as described, e.g., in U.S. Pat. No. 2,322,027 can be used. For example, they can be dissolved in a solvent and then dispersed in a hydrophilic colloid. Examples of solvents usable for this method include organic solvents having a high boiling point, such as alkyl esters of phthalic acid (e.g., dibutyl phthalate, dioctyl phthalate, etc.), phosphoric acid esters (e.g., diphenyl phosphate, triphenyl phosphate, tricresyl phosphate, dioctyl butyl phosphate, etc.), citric acid esters (e.g., tributyl acetyl citrate, etc.), benzoic acid esters (e.g., octyl benzoate, etc.), alkylamides (e.g., diethyl laurylamides, etc.), esters of fatty acids (e.g., dibutoxyethyl succinate, dioctyl azelate, etc.), trimesic acid esters (e.g., tributyl trimesate, etc.), or the like; and organic solvents having a boiling point of from about 30° to about 150° C., such as lower alkyl acetates (e.g., ethyl acetate, butyl acetate, etc.), ethyl propionate, secondary butyl alcohol, methyl isobutyl ketone, β-ethoxyethyl acetate, methyl cellosolve acetate, or the like. Mixtures of organic solvents having a high boiling point and organic solvents having a low boiling point can also be used.

It is also possible to utilize the dispersing method using polymers, as described in Japanese Patent Publication No. 39853/76 and Japanese Patent Application (OPI) No. 59943/76 (corresponding to U.S. Pat. Nos. 4,214,047 and 4,304,769).

Of the compounds according to the present invention or the couplers to be used together, those having an acid group, such as a carboxylic acid group or a sulfonic acid group, can be introduced into hydrophilic colloids as an aqueous alkaline solution.

As the binder or the protective colloid for the photographic emulsion layers or intermediate layers of the photographic light-sensitive material of the present invention, gelatin is advantageously used, but other hydrophilic colloids can be used alone or together with gelatin.

As gelatin used in the present invention, not only lime-processed gelatin, but also acid processed gelatin may be employed. The methods for preparation of gelatin are described in greater detail in Ather Veis, *The Macromolecular Chemistry of Gelatin*, Academic Press (1964).

In the photographic emulsion layer of the photographic light-sensitive material used in the present invention, any of silver bromide, silver iodobromide, silver iodochlorobromide, silver chlorobromide and silver chloride may be used as the silver halide. A preferred silver halide is silver iodobromide containing 15 mol% or less of silver iodide. A silver iodobromide emulsion containing from 2 mol% to 12 mol% of silver iodide is particularly preferred.

Although the man grain size of silver halide particles in the photographic emulsion (the mean grain size being determined with a grain diameter in those particles which are spherical or nearly spherical, and an edge length in those particles which are cubic as a grain size, and is expressed as a mean value calculated from projected areas) is not particularly limited, it is preferably 3 $\mu$ or less.

The distribution of grain size may be broad or narrow.

Silver halide particles in the photographic emulsion may have a regular crystal structure, e.g., a cubic or octaheral structure, an irregular crystal structure, e.g., a spherical or plate-like structure, or a composite structure thereof. In addition, silver halide particles composed of those having different crystal structures may be used.

Further, the photogrpahic emulsion wherein at least 50 percent of the total projected area of silver halide particles is super tabular silver halide particles having a diameter at least five times their thickness may be employed.

The inner portion and the surface layer of silver halide particles may be different in phase. Silver halide particles may be those in which a latent image is formed mainly on the surface thereof, or those in which a latent image is formed mainly in the interior thereof.

The photographic emulsion used in the present invention can be prepared in any suitable manner e.g., by the methods as described in P. Glafkides, *Chimie et Physique Photographique*, Paul Montel (1967), G. F. Duffin, *Photographic Emulsion Chemistry*, The Focal Press (1966), and V. L. Zelikman, et al., *Making and Coating Photographic Emulsion*, The Focal Press (1964). That is any of an acid process, a netural process, an ammonia process, etc., can be employed.

Soluble silver salts and soluble halogen salts can be reacted by techniques such as a single jet process, a double jet process, and a combination thereof. In addition, there can be employed a method (so-called reversal mixing process) in which silver halide particles are formed in the presence of an excess of silver ions.

As one system of the double jet process, a so-called controlled double jet process in which the pAg in a liquid phase where silver halide is formed is maintained at a predetermined level can be employed. This process can produce a silver halide emulsion in which the crystal form is regular and the grain size is nearly uniform.

Two or more kinds of silver halide emulsions which are prepared separately may be used as a mixture.

The formation or physical ripending of silver halide particles may be carried out in the presence of cadmium salts, zinc salts, lead salts, thallium salts, iridium salts or its complex salts, rhodium salts or its complex salts, iron salts or its complex salts, and the like.

Silver halide emulsions are usually chemically sensitized. For this chemical sensitization, for example, the methods as described in H. Frieser ed., *Die Grundlagen der Photographischen Prozesse mit Silberhalogeniden*, pages 675 to 734, Akademische Verlagsgesellschaft, (1968) can be used.

More specifically, a sulfur sensitization process using active gelatin or compounds (e.g., thiosulfates, thioureas, mercapto compounds and rhodanines) containing sulfur capable of reacting with silver; a reduction sensitization process using reducing substances (e.g., stannous salts, amines, hadrazine derivatives, formamidine-sulfinic acid, and silane compounds); a noble metal sensitization process using noble metal compounds (e.g., complex salts of Group VIII metals in the Periodic Table, such as Pt, Ir and Pd, etc., as well as gold complex salts); and so forth can be applied alone or in combination with each other.

The photographic emulsion used in the present invention may include various compounds for the purpose of preventing fog formation or of stabilizing photographic performance in the photogrhphic light-sensitive material during the production, storage or photographic processing thereof. For example, those compounds known as antifoggants or stabilizers can be incorporated, including azoles such as benzothiazolium salts, nitroimidazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles, mercaptotetrazoles (particularly 1-phenyl-5-mercaptotetrazole), etc.; mercaptopyrimidines; mercaptotriazines; thioketo compounds such as oxazoliethione, etc.; azaindenes such as triazaindenes, tetraazaindenes (particularly 4-hydroxy-substituted (1,3,3a,7)tetraazaindenes), pentaazaindenes, etc.; benzenethiosulfonic acids; benzenesulfinic acids; benzenesulfonic acid amides; etc.

In the photogrpahic emulsion layers or other hydrophilic colloid layers of the photographic light-sensitive material of the present invention can be incorporated various surface active agents as coating aids or for other various purposes, e.g., prevention of charging improvement of slipping properties, acceleration of emulsification and dispersion, prevention of adhesion, and improvement of photographic characteristics (for example, development acceleration, high contrast, and sensitization), etc.

The photographic emulsion layer of the photographic light-sensitive material of the present invention may contain compounds such as polyalkylene oxide or its ether, ester, amine or like derivatives, thioether compounds, thiomorpholines, quaternary ammonium salt compounds, urethane derivatives, urea derivatives, imidazole derivatives, and 3-pyrazolidones for the purpose of increasing sensitivity or contrast, or of accelerating development.

In the photographic emulsion layer or other hydrophilic colloid layers of the photographic light-sensitive material of the present invention can be incorporated water-insoluble or springly soluble synthetic polymer dispersions for the purpose of improving dimensional stability, etc. Synthetic polymers which can be used include homo- or copolymers of alkyl acrylate or methacrylate, alkoxyalkyl acrylate or methacrylate, glycidyl acrylate or methacrylate, acrylamide or methacrylamide, vinyl esters (e.g., vinyl acetate), acrylonitrile, olefins, styrene, etc. and copolymers of the foregoing monomers and acrylic acid, methacrylic acid, $\alpha,\beta$-unsaturated dicarboxylic acid, hydroxyalkyl acrylate or methacrylate, sulfoalkyl acrylate or methacrylate, and styrenesulfonic acid, etc.

The photographic emulsion used in the present invention can also be spectrally sensitized with methine dyes or other dyes. Suitable dyes which can be employed include cyanine dyes, merocyanine dyes, complex cyanine dyes, complex merocyanine dyes, holopolar cyanine dyes, hemicyanine dyes, styryl dyes, and hemioxonol dyes. Of these dyes, cyanine dyes, merocyanine dyes and complex merocyanine dyes are particularly useful.

Any conventionally utilized nuclei for cyanine dyes are applicable to these dyes as basic heterocyclic nuclei. That is, a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus, a pyridine nucleus, etc., and further, nuclei formed by condensing alicyclic hydrocarbon rings with these nuclei and nuclei formed by condensing aromatic hydrocarbon rings with these nuclei, that is, an indolenine nucleus, a benzindolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus, a quinoline nucleus, etc., are appropriate. The carbon atoms of these nuclei can also be substituted.

The merocyanine dyes and the complex merocyanine dyes that can be employed contain 5- or 6-membered heterocyclic nuclei such as a pyrazolin-5-one nucleus, a thiohydantoin nucleus, a 2-thioxazolidin-2,4-dione nucleus, a thiazolidine-2,4-dione nucleus, a rhodanine nucleus, a thiobarbituric acid nucleus, and the like.

These sensitizing dyes can be employed individually and can also be employed in combination. A combination of sensitizing dyes is often used particularly for the purpose of supersensitization.

The sensitizing dyes may be present in the emulsion together with dyes which themselves do not give rise to spectrally sensitizing effects but exhibit a supersensitizing effect or materials which do not substantially absorb visible light but exhibit a supersensitizing effect. For example, aminostilbene compounds substituted with a nitrogen-containing heterocyclic group (e.g., those described in U.S. Pat. Nos. 2,933,390 and 3,635,721), aromatic organic acid-formaldehyde condensates (e.g., those described in U.S. Pat. No. 3,743,510), cadmium salts, azaindene compounds, and the like, can be present.

The photographic light-sensitive material of the present invention may contain inorganic or orgnaic hardeners in the photographic emulsion layer and other hydrophilic colloid layers thereof. For example, chromium salts (e.g., chromium alum, chromium acetate, etc.), aldehydes (e.g., formaldehyde, glyoxal, glutaraldehyde, etc.), N-methylol compounds (e.g., dimethylolurea, methyloldimethylhydantoin, etc.) dioxane derivatives (e.g., 2,3-dihydroxydioxane, etc.), active vinyl compounds (e.g., 1,3,5-triacryloylhexahydro-s-triazine, 1,3-vinyl-sulfonyl-2-propanol, etc.), active halogen compounds (e.g., 2,4-dichloro-6-hydroxy-s-triazine, etc.), and mucohalogenic acids (e.g., mucochloric acid, mucophenoxychloric acid, etc.) can be used alone or in combination with each other.

In the photographic light-sensitive material of the invention, when dyes, ultraviolet ray absorbing agents, and the like are incorporated in the hydrophilic colloid layers, they may be mordanted with cationic polymers, etc.

The photographic light-sensitive materials of the present invention may contain therein hydroquinone derivatives, aminophenol derivatives, gallic acid derivatives, ascorbic acid derivatives, etc., as color fog preventing agents.

The hydrophilic colloid layers of the photographic light-sensitive material of the present invention can contain ultraviolet ray absorbing agents. For example, benzotriazole compounds substituted with aryl groups (e.g., those described in U.S. Pat. No. 3,533,794), 4-thiazolidone compounds (e.g., those described in U.S. Pat. Nos. 3,314,794 and 3,352,681), benzophenone compounds (e.g., those described in Japanese Patent Application (OPI) No. 2784/71 (corresponding to U.S. Pat. No. 3,785,827), cinnamic acid ester compounds (e.g., those described in U.S. Pat. Nos. 3,705,805 and 3,707,375), butadiene compounds (e.g., those described in U.S. Pat. No. 4,045,229) or benzoxazole compounds (e.g., those described in U.S. Pat. No. 3,700,455) can be employed. Ultraviolet ray absorbing couplers (e.g., α-naphthol type cyan dye forming couplers) and ultraviolet ray absorbing polymers can also be employed. These ultraviolet ray absorbing agents can also be mordanted in a specific layer(s), if desired.

The photographic light-sensitive material of the present invention may contain water-soluble dyes in the hydrophilic colloid layers theyof as filter dye or for various purposes, e.g., irradiation prevention. Examples of such dyes include oxonol dyes, hemioxonole dyes, styryl dyes, merocyanine dyes, cyanine dyes, and azo dyes. In particular, oxonol dyes, hemioxonol dyes, and merocyanine dyes are useful.

In carrying out the present invention, known color fading preventing agents described below can be used together. Color image stabilizing can be used alone or in combination with each other. Typical known color fading preventing agents include hydroquinone derivatives, gallic acid derivatives, p-alkoxyphenols, p-oxyphenol derivatives, and bisphenols, etc.

The present invention will be explained in greater detail with reference to the following example, but the present invention should not be construed as being limited thereto.

EXAMPLE 1

In order to evaluate the effectiveness of the compound according to the present invention. A multilayer color photographic light-sensitive material (sample 101) comprising a cellulose triacetate film support having coated thereon layers having the compositions described below was prepared. The coating amount of an emulsion is indicated using an amount of silver coated.

Sample 101:

| First Layer: Antihalation Layer | |
|---|---|
| A gelatin layer containing | |
| Black colloidal silver | 0.15 g/m$^2$ |
| Ultraviolet ray absorbing agent UV-1 | 0.10 g/m$^2$ |
| Ultraviolet ray absorbing agent UV-2 | 0.14 g/m$^2$ |
| High boiling organic solvent O-1 | 0.04 g/m$^2$ |
| Second Layer: Intermediate Layer | |
| A gelatin layer containing | |
| 2,5-Di-tert-pentadecylhydroquinone | 0.15 g/m$^2$ |
| Coupler Cp-1 | 0.05 g/m$^2$ |
| High boiling organic solvent O-2 | 0.01 g/m$^2$ |
| Third Layer: First Red-Sensitive Emulsion Layer | |
| A gelatin layer containing | |
| Silver iodobromide emulsion (iodide content: 4 mol %, average particle size: 0.5 μ) | 1.44 g/m$^2$ |
| Sensitizing dye I | $1.0 \times 10^{-4}$ mol per mol of silver |
| Sensitizing dye II | $2.5 \times 10^{-5}$ mol per mol of silver |
| Sensitizing dye III | $3.5 \times 10^{-5}$ mol per mol of silver |
| Sensitizing dye IV | $2.2 \times 10^{-4}$ mol per mol of silver |
| Coupler Cp-2 | 0.45 g/m$^2$ |
| Coupler Cp-3 | 0.03 g/m$^2$ |
| High boiling organic solvent O-2 | 0.50 g/m$^2$ |
| Fourth Layer: Second Red-Sensitive Emulsion Layer | |
| A gelatin layer containing | |
| Silver iodobromide emulsion (iodide content: 9 mol %, average particle size: 1.0 μ) | 0.95 g/m$^2$ |
| Sensitizing dye I | $7 \times 10^{-5}$ mol per mol of silver |
| Sensitizing dye II | $2.0 \times 10^{-5}$ mol per mol of silver |
| Sensitizing dye III | $2.8 \times 10^{-4}$ mol per mol of silver |
| Sensitizing dye IV | $2.0 \times 10^{-5}$ mol per mol of silver |
| Coupler Cp-2 | 0.015 g/m$^2$ |
| Coupler Cp-3 | 0.030 g/m$^2$ |
| Coupler Cp-4 | 0.060 g/m$^3$ |
| High boiling organic solvent O-2 | 0.30 g/m$^2$ |
| Fifth Layer: Intermediate Layer | |
| A gelatin layer containing | |
| 2,5-Di-tert-octylhydroquinone | 0.03 g/m$^2$ |
| High boiling organic solvent O-2 | 0.06 g/m$^2$ |
| Sixth Layer: First Green-Sensitive Emulsion Layer | |
| A gelatin layer containing | |
| Silver iodobromide emulsion (iodide content: 5 mol % average particle size: 0.5μ) | 0.80 g/m$^2$ |
| Sensitizing dye V | $2.2 \times 10^{-4}$ mol per mol of silver |
| Sensitizing dye VI | $4.5 \times 10^{-4}$ mol per mol of silver |
| Coupler Cp-5 | 0.55 g/m$^2$ |
| Coupler Cp-1 | 0.10 g/m$^2$ |
| Coupler Cp-6 | 0.008 g/m$^2$ |
| Coupler Cp-7 | 0.043 g/m$^2$ |
| High boiling organic solvent O-3 | 0.60 g/m$^2$ |
| Seventh Layer: Second Green-Sensitive Emulsion Layer | |
| A gelatin layer containing | |
| Silver iodobromide emulsion (iodide content: 8 mol %, average particle size: 0.9μ) | 0.85 g/m$^2$ |
| Sensitizing dye V | $0.9 \times 10^{-4}$ mol per mol of silver |
| Sensitizing dye VI | $1.9 \times 10^{-4}$ mol per mol of silver |
| Coupler Cp-8 | 0.075 g/m$^2$ |
| Coupler Cp-1 | 0.030 g/m$^2$ |
| High boiling organic solvent O-2 | 0.30 g/m$^2$ |
| Eighth Layer: Yellow Filter Layer | |

-continued

| A gelatin layer containing | |
|---|---|
| Yellow colloidal silver | 0.08 g/m² |
| 2,5-Di-tert-octylhydroquinone | 0.13 g/m² |
| Ninth Layer: First Blue-Sensitive Emulsion Layer | |
| A gelatin layer containing | |
| Silver iodobromide emulsion (iodide content: 6 mol %, average particle size: 0.6μ) | 0.37 g/m² |
| Coupler Cp-9 | 0.71 g/m² |
| Coupler Cp-7 | 0.07 g/m² |
| High boiling organic solvent O-2 | 0.26 g/m² |
| Tenth Layer: Second Blue-Sensitive Emulsion Layer | |
| A gelatin layer containing | |
| Silver iodobromide emulsion (iodide content: 10 mol %, average particle size: 0.8μ) | 0.55 g/m² |
| Coupler Cp-9 | 0.23 g/m² |
| High boiling organic solvent O-2 | 0.08 g/m² |
| Eleventh Layer: First Protective Layer | |
| A gelatin layer containing | |
| Silver iodobromide (iodide content: 1 mol %, average particle size: 0.07μ) | 0.2 g/m² |
| Ultraviolet ray absorbing agent UV-1 | 0.07 g/m² |
| Ultraviolet ray absorbing agent UV-2 | 0.20 g/m² |
| High boiling Organic solvent O-1 | 0.043 g/m² |
| Twelfth Layer: Second Protective Layer | |
| A gelatin layer containing | |
| Polymethyl methacrylate particles (diameter: 1.5μ) | 0.15 g/m² |

In addition to the above-described components, Gelatin hardener H-1 and a surface active agent were added to each of the layers.

The samples thus-prepared by designated Sample 101.

Samples 102 and 103:

Using an equi-molar amount of each of Compound C-2 and C-3 which restore a cyan dye according to the present invention in place of Coupler Cp-2 in the third layer of Sample 101, photographic light-sensitive materials were prepared and they were subjected to the color development processing described below, whereby extremely high cyan color densities in comparison with that of Sample 101 were obtained. Then, in the same manner as described for Sample 101, except that in order to substantially adapt the gradation thereof to that of Sample 101, an amount of C-2 or C-3 to be added was adjusted to ¼ by mole of that of Cp-2 and further the amounts of high boiling organic solvent for dispersion and gelatin were reduced, Sample 102 and 103 were prepared. The amount of high boiling organic solvent coated was reduced to ¼ of Sample 101 and the coating amount of gelatin was also reduced from 1.8 g/m² to 1.1 g/m².

Sample 104:

In the same manner as described for Sample 101 except that ½ by mol of Cp-2 in Sample 101 and ½ by more of C-3 in sample 103 were used in place of Cp-2 in the third layer of Sample 101, Sample 104 were prepared. The amount of high boiling organic solvent coated was reduced to 63% of Sample 101 and the coating amount gelatin was also reduced to 1.45 g/m².

The structures of the compounds used for the preparation of these samples are as follows:

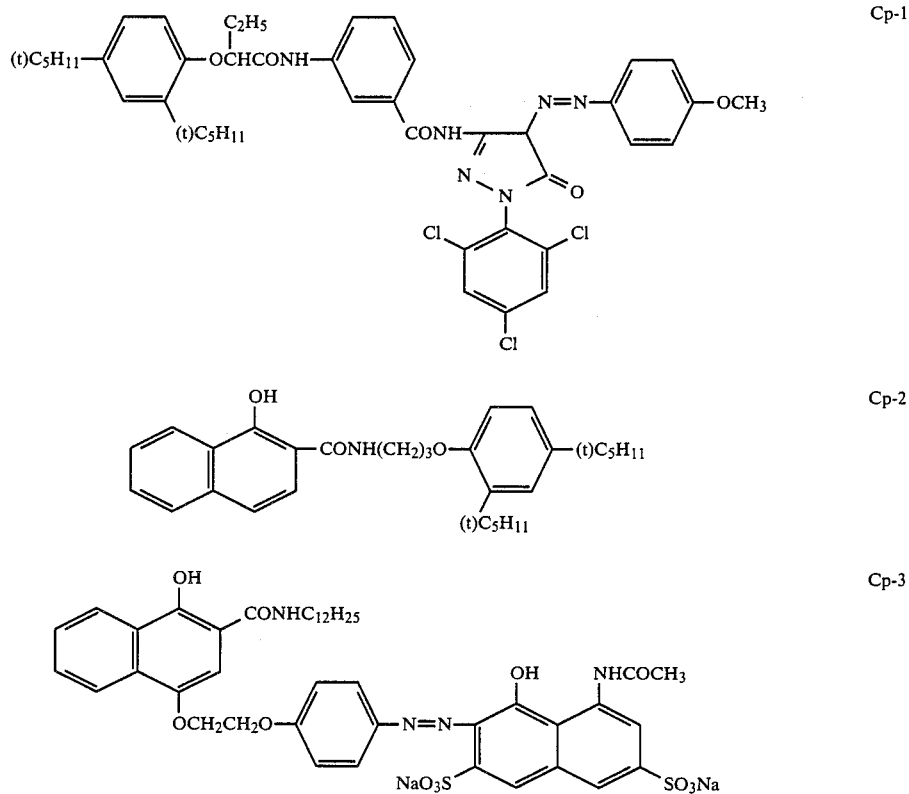

-continued
Cp-4
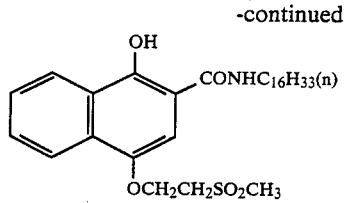
Cp-5
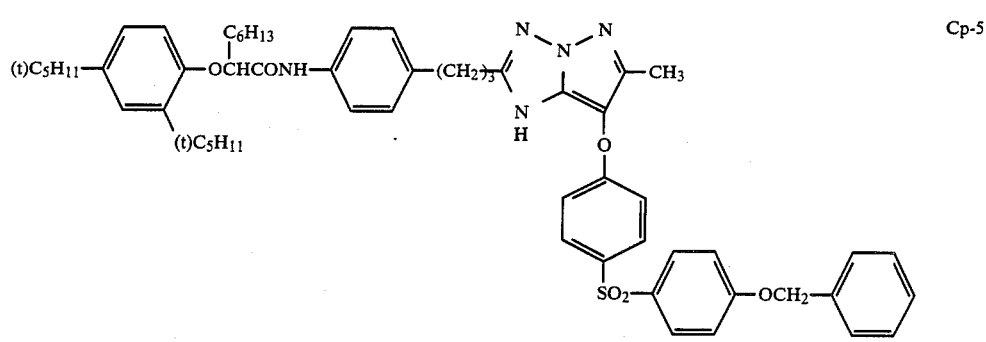
Cp-6
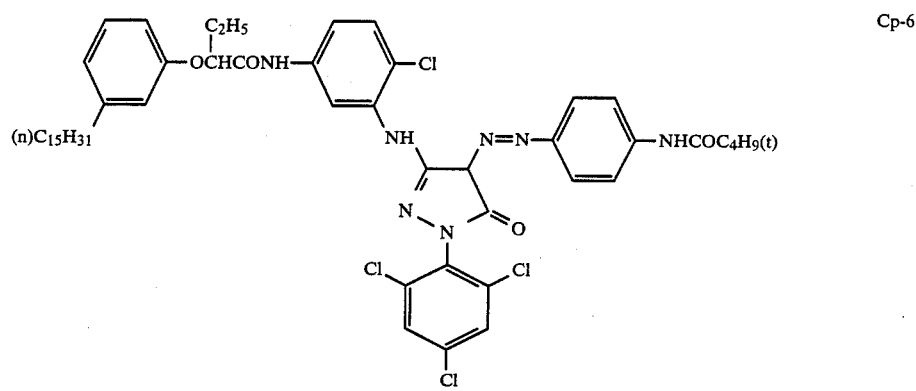
Cp-7
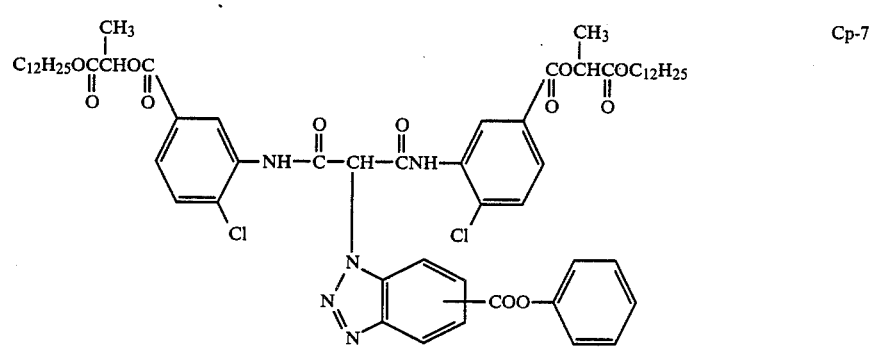
Cp-8
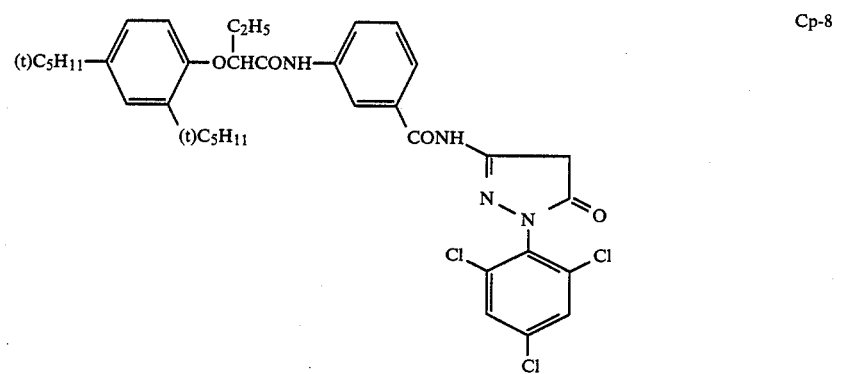

-continued
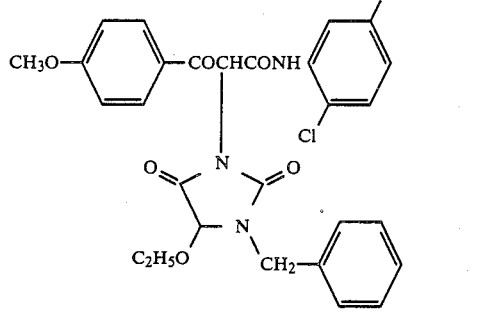
Cp-9
0-1    0-2    $C_{11}H_{23}CON(C_2H_5)_2$    0-3
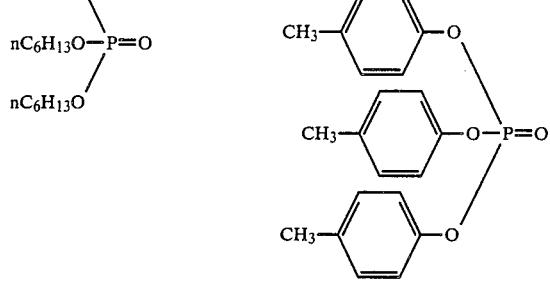
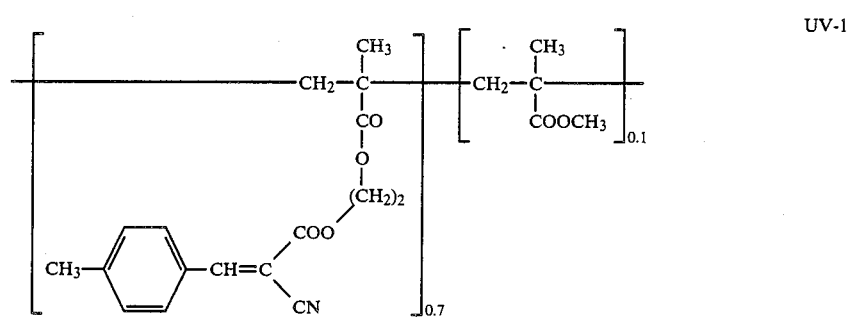
UV-1
UV-2
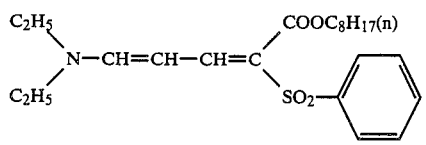
Sensitizing Dye I
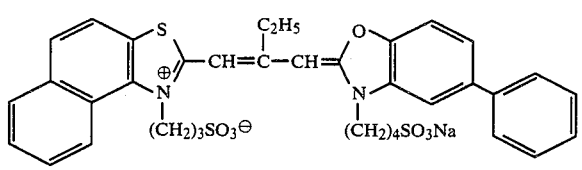
Sensitizing Dye II
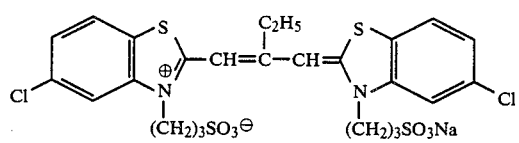
Sensitizing Dye III
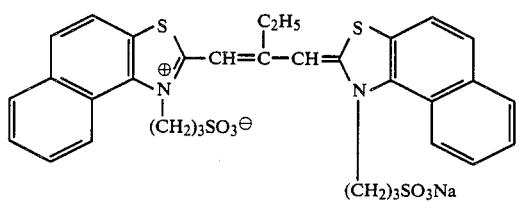

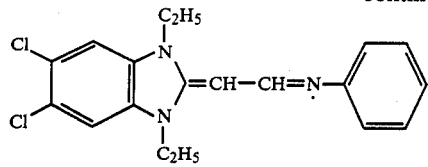

Sensitizing Dye IV

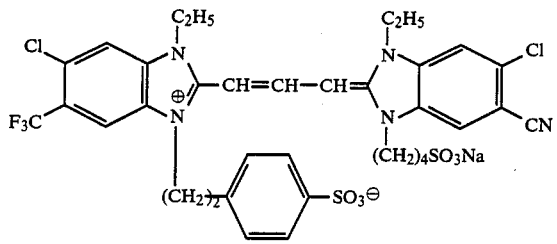

Sensitizing Dye V

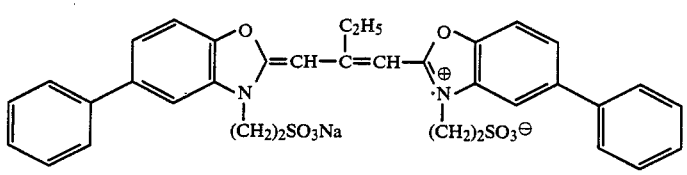

Sensitizing Dye VI (CH$_2$=CHSO$_2$CH$_2$CONHCH$_2$)$_2$  H-1

These samples were subjected to imagewise exposure for sensitometry to white light and imagewise exposure using a red filter (SC-62 manufactured by Fuji Photo Film Co., Ltd.) and then color development processing described below.

Further, these samples were exposed to light for measurement of MTF values and subjected to the same color development processing.

The MTF values were determined according to the method as described in T. H. James, *The Theory of the Photographic Process*, 4th Ed., page 605, Macmillan Co. (1977).

Moreover, color turbidities of yellow and magenta to red light were indicated using $D_B/B_R$ and $D_G/D_R$ respectively. Those values mean yellow density ($D_B$) and magenta density ($D_G$) at an exposure amount necessary to obtain cyan density ($D_R$) of 1.0 measured, after exposing these samples through a green filter and processing as described below, respectively. The density used herein denotes density of apparent density minus fog density.

The development processing was carried out at 38° C. according to the following processing steps.

| Processing Steps | Time |
|---|---|
| 1. Color development | 3 min and 15 sec |
| 2. Bleaching | 6 min and 30 sec |
| 3. Washing with water | 3 min and 15 sec |
| 4. Fixing | 4 min and 20 sec |
| 5. Washing with water | 3 min and 15 sec |
| 6. Stabilizing | 1 min and 30 sec |

The composition of each processing solution used in the above-described processing as follows.

| Color Developing Solution | |
|---|---|
| Sodium nitrilotriacetate | 1.0 g |
| Sodium sulfite | 4.0 g |
| Sodium carbonate | 30.0 g |
| Potassium bromide | 1.4 g |
| Hydroxylamine sulfate | 2.4 g |
| 4-(N—Ethyl-N—β-hydroxyethylamino)-2-methylaniline sulfate | 4.5 g |
| Water to make | 1.0 liter |
| Bleaching Solution | |
| Ammonium bromide | 160.0 g |
| Aqueous ammonia (28%) | 25.0 ml |
| Sodium ethylenediaminetetraacetato iron (III) | 130.0 g |
| Glacial acetic acid | 14.0 ml |
| Water to make | 1.0 liter |
| Fixing Solution | |
| Sodium tetrapolyphosphate | 2.0 g |
| Sodium sulfite | 4.0 g |
| Ammonium thiosulfate aqueous solution (70%) | 175.0 ml |
| Sodium bisulfite | 4.6 g |
| Water to make | 1.0 liter |
| Stabilizing Solution | |
| Formalin | 8.0 ml |
| Water to make | 1.0 liter |

The results thus-obtained with each sample are shown in Table 1 below.

TABLE 1

| Sample | Coupler in Third Layer | Relative Sensitivity* at Cyan Density | $D_B/D_R$ | $D_G/D_R$ | MTF (40 cycles/mm) |
|---|---|---|---|---|---|
| 101 (Comparison) | Cp-2 | 100 | 0.10 | 0.08 | 0.22 |
| 102 (Present Invention) | C-2 | 98 | 0.02 | 0.03 | 0.30 |
| 103 (Present Invention) | C-3 | 100 | 0.02 | 0.02 | 0.29 |
| 104 (Present Invention) | C-3/Cp-2 | 103 | 0.06 | 0.05 | 0.26 |

Relative Sensitivity is shown by a reciprocal of the exposure amount required for obtaining a density of the fog + 0.2 and the sensitivity of Sample 101 is taken as 100.

From the results shown in Table 1, it is apparent that the compounds acoording to the present invention have an extremely high color forming proprerty in comparison with heretofore known coupler and thus they made it possible to reduce a thickness of the emulsion layer, resulting in providing a photogrhphic light-sensitive material of improved sharpness and reduced color turbidity.

EXAMPLE 2

In order to evaluate the effectiveness of the compound according to the present invention, an emulsion layer having the composition described below was coated on a baryta coated paper provided with a subbing layer to prepare Sample 201.

Sample 201:

| Emulsion Layer: | |
|---|---|
| Negative type silver chlorobromide emulsion (chloride content: 30 mol %, average particle size: 0.6μ) | 0.43 g/m² |
| Yellow coupler Cp-10 | 0.22 g/m² |
| Oil O-3 | 0.05 g/m² |
| Gelatin | 2.0 g/m² |
| Protective Layer: | |
| Gelatin | 1.3 g/m² |
| 2,4-Dichloro-6-hydroxy-s-triazine sodium salt | 50 mg/m² |

Samples 202 and 203:

Using an equi-molar amount of each of Yellow coupler Cp-11 and Compound Y-2 according to the present invention in place of Yellow coupler Cp-10 in Sample 201, Samples 202 and 203 were prepared, respectively.

The structure of the couplers used for the preparation of these samples are as follows:

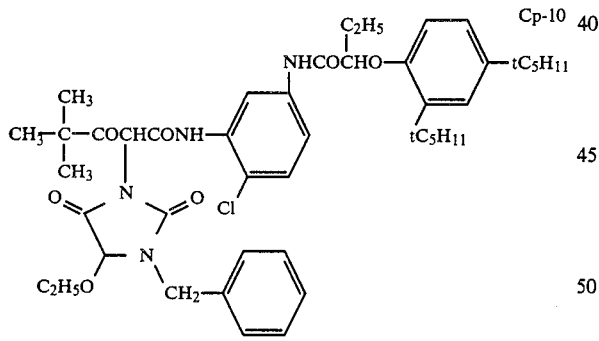

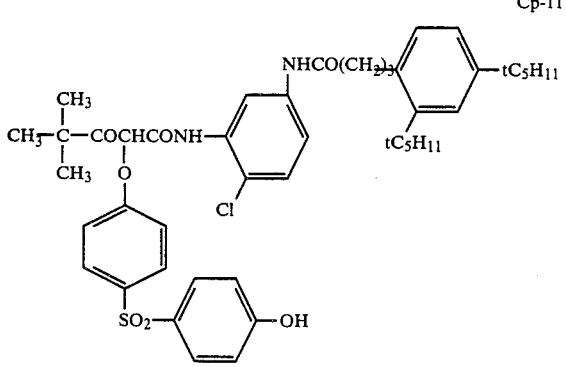

These samples were subjected to imagewise exposure for sensitometry and the following color development processing.

| Processing Steps | Time | Temperature |
|---|---|---|
| 1. Color development | 3 min and 30 sec | 33° C. |
| 2. Bleach-fixing | 1 min and 30 sec | 33° C. |
| 3. Washing with water | 2 min and 30 sec | 25 to 30° C. |

Each processing solution for the color development processing step had the following composition.

| Color Developing Solution: | |
|---|---|
| Benzyl alcohol | 15 ml |
| Diethylene glycol | 8 ml |
| Ethylenediaminetetraacetic acid | 5 g |
| Sodium sulfite | 2 g |
| Anhydrous potassium carbonate | 30 g |
| Hydroxylamine sulfate | 3 g |
| Potassium bromide | 0.6 g |
| 4-Amino-N—ethyl-N—(β-methanesulfonamidoethyl)-m-toluidine sesquisulfate monohydrate | 5 g |
| Water to make | 1 liter |
| Adjusted pH = 10.20 | |
| Bleach-Fixing Solution: | |
| Ethylenediaminetetraacetic acid | 2 g |
| Ethylenediaminetetraacetato ferric complex | 40 g |
| Sodium sulfite | 5 g |
| Ammonium thiosulfate | 70 g |
| Water to make | 1 liter |

The photographic properties thus-obtained are shown in Table 2 below.

TABLE 2

| Sample | Compound | Fog | Gamma | Relative Sensitivity | Maximum Density |
|---|---|---|---|---|---|
| 201 (Comparison) | Cp-10 | 0.03 | 1.75 | 100 | 1.56 |
| 202 (Comparison) | Cp-11 | 0.03 | 1.83 | 105 | 1.60 |
| 203 (Present Invention) | Y-2 | 0.04 | 2.11 | 123 | 2.83 |

From the results shown in Table 2, it is apparent that the compound according to the present invention has a high color forming property.

EXAMPLE 3

Sample 301:

Using an equi-molar amount of Compound M-2 which releases a magenta dye upon cleavage according to the present invention in place of Coupler Cp-5 in the sixth layer of Sample 101 in Example 1, a photographic light-sensitive material was prepared and it was subjected to the same color development processing as described in Example 1, whereby an extremely high color forming property was observed. Then, in the same manner as described for Sample 101, except that an amount of M-2 to be added was adjusted to ½ by mole of that of Cp-5 and further the amounts of high boiling organic solvent and gelatin were reduced, Sample 301 was prepared. The coating amount of gelatin was reduced from 2.5 g/m² to 1.5 g/m².

Samples 101 and 301 were subjected to imagewise exposure to white light and exposure through a green filter and then the same color development processing as described in Example 1. The results thus-obtained are shown in Table 3 below.

TABLE 3

| Sample | Coupler in Sixth Layer | Relative Sensitivity at Magenta Density | $D_B/D_G$ | MTF (40 cycles/mm) |
|---|---|---|---|---|
| 101 (Comparison) | Cp-5 | 100 | 0.10 | 0.41 |
| 301 (Present Invention) | M-2 | 103 | 0.01 | 0.46 |

From the result shown in Table 3, it is apparent that the compound according to the present invention exhibites a high color forming properly. Further, in order to obtain a certain color density, it is possible to remarkably reduce the thickness of the layer, thus resulting in improvement in sharpness.

Moreover, since the compound according to the present invention also have a function of known colored coupler used for masking, an amount of the colored coupler used can be reduced to further eliminate color turbudity.

EXAMPLE 4

On a transparent cellulose triacetate film support provided with a subbing layer was coated an emulsion layer having the composition described below to prepare Sample 401.

Sample 401:

| Emulsion Layer: | |
|---|---|
| Negative type silver iodobromide emulsion (iodide content: 4 mol %, average particle size: 0.6μ) | 1.44 g/m² |
| Yellow Coupler Cp-12 | 0.42 g/m² |
| Oil O-3 | 0.20 g/m² |
| Gelatin | 3.5 g/m² |
| Protective Layer: | |
| Gelatin | 1.3 g/m² |
| 2,4-Dichloro-6-hydroxy-s-triazine sodium salt | 50 mg/m² |

Sample 402:

Using an equi-molar amount of Compound Y-2 according to the present invention in place of Yellow coupler Cp-12 in Sample 401, Sample 402 was prepared.

The structure of the coupler used for the preparation of the sample is as follows:

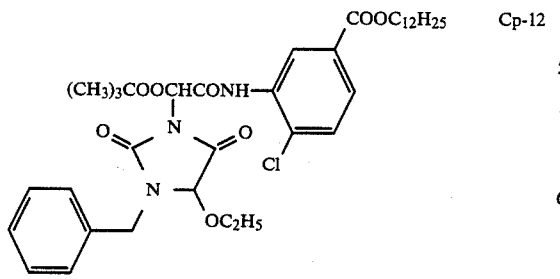

Cp-12

These samples were subjected to exposure for sensitometry and the following color development processing.

Color Development Processing Step (38° C.)

| | Time (min) |
|---|---|
| 1. First development | 3 |
| 2. Washing with water | 1 |
| 3. Reversal | 2 |
| 4. Color development | 6 |
| 5. Control | 2 |
| 6. Bleaching | 6 |
| 7. Fixing | 4 |
| 8. Washing with water | 4 |
| 9. Stabilizing | 1 |
| 10. Drying | |

The processing solutions used in the color development processing had the following compositions:

| First Development Solution | |
|---|---|
| Water | 800 ml |
| Sodium Tetrapolyphosphate | 2.0 g |
| Sodium Hydrogensulfite | 8.0 g |
| Sodium Sulfite | 37.0 g |
| 1-Phenyl-3-pyrazolidone | 0.35 g |
| Hydroquinone | 5.5 g |
| Sodium Carbonate Monohydrate | 28.0 g |
| Potassium Bromide | 1.5 g |
| Potassium Iodide | 13.0 mg |
| Sodium Thiocyanate | 1.4 g |
| Water to make | 1.0 liter |
| Reversal Solution | |
| Water | 800 ml |
| Hexasodium Nitrilo-N,N,N—trimethylene Phosphonate | 3.0 g |
| Stannous Chloride Dihydrate | 1.0 g |
| Sodium Hydroxide | 8.0 g |
| Glacial Acetic Acid | 15.0 ml |
| Water to make | 1.0 liter |
| Color Development Solution | |
| Water | 800 ml |
| Sodium Tetrapolyphosphate | 2.0 g |
| Benzyl Alcohol | 5.0 ml |
| Sodium Sulfite | 7.5 g |
| Trisodium Phosphate (12 hydrate) | 36.0 g |
| Potassium Bromide | 1.0 g |
| Potassium Iodide | 90.0 mg |
| Sodium Hydroxide | 3.0 g |
| Citrazinic Acid | 1.5 g |
| 4-Amino-3-methyl-N—ethyl-N—(β-hydroxyethyl)aniline Sesquisulfate Monohydrate | 11.0 g |
| Ethylenediamine | 3.0 g |
| Water to make | 1.0 liter |
| Control Solution | |
| Water | 800 ml |
| Glacial Acetic Acid | 5.0 ml |
| Sodium Hydroxide | 3.0 g |
| Dimethylaminoethaneisothiourea Dihydrochloride | 1.0 g |
| Water to make | 1.0 liter |
| Bleaching Solution | |
| Water | 800 ml |
| Sodium Ethylenediaminetetraacetate Dihydrate | 2.0 g |
| Ammonium Iron (II) Ethylenediaminetetraacetate Dihydrate | 120 g |
| Potassium Bromide | 100.0 g |
| Water to make | 1.0 liter |
| Fixing Solution | |
| Water | 800 ml |
| Ammonium Thiosulfate | 80.0 g |
| Sodium Sulfite | 5.0 g |
| Sodium Hydrogensulfite | 5.0 g |
| Water to make | 1.0 liter |
| Stabilizing Bath | |
| Water | 800 ml |
| Formalin (37 wt %) | 5.0 ml |
| Fuji Driwel | 5.0 ml |
| Water to make | 1.0 liter |

The photographic properties thus-obtained are shown in Table 4 below.

TABLE 4

| Sample | Fog | Gamma | Maximum Color Density |
|---|---|---|---|
| 401 (Comparison) | 0.05 | 1.07 | 1.65 |
| 402 (Present Invention) | 0.06 | 1.42 | 3.42 |

From the results shown in Table 4, it is apparent that the compound according to the present invention has a high color forming property in comparison with known coupler.

While the invention has been described in detail and with reference to specific embodiments thereof, it will be apparent to one skilled in the art that various changes and modifications can be made therein without departing from the spirit and scope thereof.

What is claimed is:

1. A silver halide color photographic material comprising a support having provided thereon at least one silver halide emulsion layer, wherein the photographic material contains a compound represented by the general formula (I):

A—X—Dye    (I)

wherein A represents a group capable of releasing X-Dye upon reaction with the oxidation product of a developing agent selected from the group consisting of a yellow coupler residue, a magenta coupler residue, a cyan coupler residue, a non-color forming coupler residue or a hydroquinone; X represents an oxygen atom, a sulfur atom or an imino group directly attached to the coupling position of A; and Dye represents a dye residue which has X as an auxochrome; and A and Dye may have a connection other than X to form a cyclic structure; and said compound represented by the general formula (I) may be a bis-type coupler or a polymer coupler which compound has a dye portion in which the maximum absorption wavelength is shifted by a bond that is cleaved upon reaction with an oxidation product of a developing agent and is capable of forming a diffusion resistant compound having a dye portion possessing the maximum absorption wavelength which is not shifted as a result of the reaction with an oxidation product of a developing agent.

2. A silver halide color photographic material as claimed in claim 1, wherein said compound represented by the general formula (I) is employed in an amount of from 0.005 mol to 0.5 mol per mol of silver.

3. A silver halide color photographic material is claimed in claim 2, wherein said compound represented by the general formula (I) is employed in an amount of from 0.01 mol to 0.3 mol per mol of silver.

4. A silver halide color photographic material as claimed in claim 1, wherein said photographic material is a conventional color photographic light-sensitive material.

5. A silver halide color photographic material as claimed in claim 1, wherein a total number of the carbon atoms included in X-Dye is from 20 to 40.

6. A silver halide color photographic material as claimed in claim 1, wherein said X-Dye formed from the compound represented by the general formula (I) is an image forming agent in the layer to which the compound is added or an adjacent layer thereto.

7. A silver halide color photographic material as claimed in claim 1, wherein said compound represented by the general formula (I) is added to a light-sensitive silver halide containing layer or an adjacent layer thereto.

8. A silver halide color photographic material as claimed in claim 1, wherein said compound represented by the general formula (I) is incorporated into a light-sensitive silver halide emulsion layer and a light-sensitive area of the emulsion layer and color image formed with X-Dye are substantially in a complementary relationship.

9. A silver halide color photographic material as claimed in claim 1, wherein X-Dye does not contain a carboxy group or a sulfo group.

10. A silver halide color photographic material as claimed in claim 1, wherein A represents said hydroquinone.

11. A silver halide color photographic material as claimed in claim 1, wherein A represents said yellow coupler residue which is represented by the general formulae (II) or (III):

$$R_1-\overset{O}{\underset{}{C}}-\overset{}{\underset{|}{CH}}-\overset{O}{\underset{}{C}}-NH-R_2 \quad (II)$$

$$R_3-NH-\overset{O}{\underset{}{C}}-\overset{}{\underset{|}{CH}}-\overset{O}{\underset{}{C}}-NH-R_2 \quad (III)$$

wherein $R_1$ represents an aliphatic group, an aromatic group, an alkoxy group or heterocyclic group; and $R_2$ and $R_3$ each represents an aromatic group or a heterocyclic group.

12. A silver halide color photographic material as claimed in claim 11, wherein the aliphatic group represented by $R_1$ is an alkyl group which may be substituted with a substituent selected from an alkoxy group, an aryloxy group, an amino group, an acrylamino group and a halogen atom.

13. A silver halide color photographic material as claimed in claim 11, wherein the aromatic group represented by $R_1$, $R_2$ or $R_3$ is a phenyl group which may be substituted with a substituent selected from an alkyl group, an alkenyl group, an alkoxy group, an alkoxycarbonyl group, an alkoxycarbonylamino group, an aliphatic amido group, alkylsulfamoyl group, an alkylureido group, an alkyl-substituted succinimido group each containing 32 or less carbon atoms, an aryloxy group, an aryloxycarbonyl group, an arylcarbamoyl group, arylamido group, an arylsulfamoyl group, an arylsulfonamido group, an arylureido group, an amino group, a hydroxy group, a carboxy group, a sulfo group, a nitro group, a cyano group, a thiocyano group, and a halogen atom.

14. A silver halide color photographic material as claimed in claim 11, wherein the aromatic group represented by $R_1$, $R_2$ or $R_3$ is a naphthyl group, a quinolyl group, an isoquinolyl group, a chromanyl group, a coumaranyl group or a tetrahydronaphthyl group.

15. A silver halide color photographic material as claimed in claim 11, wherein the alkoxy group represented by $R_1$ is an alkoxy group in which the alkyl moiety represents a straight chain or branched chain alkyl group having from 1 to 32 carbon atoms, an alkenyl group, a cyclic alkyl group or a cyclic alkenyl group each of which may be substituted with a substituent selected from a halogen atom, an aryl group and an alkoxy group.

16. A silver halide color photographic material as claimed in claim 11, wherein the heterocyclic group represented by $R_1$, $R_2$ or $R_3$ is a group derived from a hetero ring selected from thiophene, furan, pyran, pyrrole, pyrazole, pyridine, pyrazine, pyrimidine, pyridazine, indolizine, imidazole, thiazole, oxazole, triazine, thiadiazole and oxazine.

17. A silver halide color photographic material as claimed in claim 1, wherein A represents said magenta coupler residue which is represented by the general formula (IV), (V), (VI) or (VII):

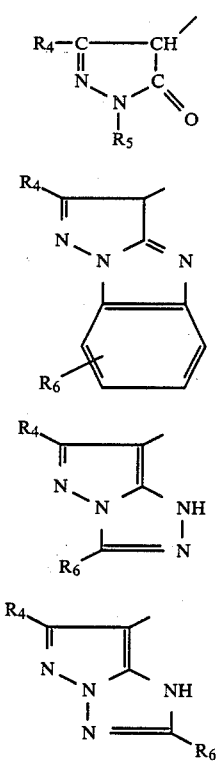

wherein $R_5$ represents a straight chain or branched chain alkyl group having from 1 to 32 carbon atoms, an alkenyl group, a cyclic alkyl group, an aralkyl group or a cyclic alkenyl group each of which may be substituted with a substituent selected from a halogen atom, a nitro group, a cyano group, an aryl group, an alkoxy group, an aryloxy group, a carboxy group, an alkylthiocarbonyl group, an arylthiocarbonyl group, an alkoxycarbonyl group, an aryloxycarbonyl group, a sulfo group, a sulfamoyl group, a carbamoyl group, an acylamino group, a diacylamino group, a ureido group, a urethane group, a thiourethane group, a sulfonamido group, a heterocyclic group, an arylsulfonyl group, an alkylsulfonyl group, an arylthio group, an alkylthio group, an alkylamino group, a dialkylamino group, an anilino group, an N-arylanilino group, an N-alkylanilino group, an N-acylanilino group, a hydroxy group and a mercapto group; an aryl group which may be substituted with a substituent selected from an alkyl group, an alkenyl group, a cyclic alkyl group, a halogen atom, a nitro group, a cyano group, an aryl group, an alkoxy group, an aryloxy group, a carboxy group, an alkoxycarbonyl group, an arylxycarbonyl group, a sulfo group, a sulfamoyl group, a carbamoyl group, an acylamino group, a diacylamino group, a ureido group, a urethane group, a sulfonamido group, a heterocyclic group, an arylsulfonyl group, an alkylsulfonyl group, an arylthio group, an alkylthio group, an alkylamino group, a dialkylamino group, an anilino group, an N-alkylanilino group, an N-arylanilino group, an N-acylanilino group, a hydroxy group and a mercapto group; a heterocyclic group which may be substituted with a substituent selected from the substituents as defined for the above-described aryl group; an aliphatic acyl group; an aromatic acyl group; alkylsulfonyl group; an arylsulfonyl group; an alkylcarbamoyl group; an arylcarbamoyl group; an alkylthiocarbamoyl group; or an arylthiocarbamoyl group; $R_4$ represents a hydrogen atom; a straight chain or branched chain alkyl group having from 1 to 32 carbon atoms, an alkenyl group, a cyclic alkyl group, an aralkyl group, a cyclic alkenyl group, an aryl group or a heterocyclic group each of which may be substituted with a substituent selected from the substituents as defined for these groups of $R_5$ respectively; an alkoxycarbonyl group; an aryloxycarbonyl group; an aralkyloxycarbonyl group; an alkoxy group; an aryloxy group; an alkylthio group; an arylthio group; a carboxy group; an acylamino group; a diacylamino group; an N-alkylacylamino group; an N-arylacylamino group; a ureido group; a urethane gorup; a thiourethane group; an arylamino group; an alkylamino group, a cycloamino group; a heterocyclic amino group; an alkylcarbonyl group; an arylcarbonyl group; a sulfonamido group; a carbamoyl group; a sulfamoyl group; a cyano group; a hydroxy group; a mercapto group; a halogen atom; or a sulfo group; and $R_6$ represents a hydrogen atom; a straight chain or branched chain alkyl group having from 1 to 32 carbon atoms, an alkenyl group, a cyclic alkyl group, an aralkyl group, a cyclic alkenyl group, an aryl group or a heterocyclic group each of which may be substituted with a substituent selected from the substituents as defined for these groups of $R_5$ respectively; a cyano group; an alkoxy group, an aryloxy group, a halogen atom, a carboxy group, an alkoxycarbonyl group, an aryloxycarbonyl group, an acyloxy group, a sulfo group, a sulfamoyl group, a carbamoyl group, an acylamino group, a diacylamino group, a ureido group, a urethane group, a sulfonamido group, an arylsulfonyl group, an alkylsulfonyl group, an arylthio group, an alkylthio group, an alkylamino group, a dialkylamino group, an anilino group, an N-arylanilino group, an N-alkylanilino group, an N-acylanilino group, a hydroxy group or a mercapto group.

18. A silver halide color photographic material as claimed in claim 1, wherein A represents said cyan coupler residue which is represented by the general formula (VIII), (IX) or (X):

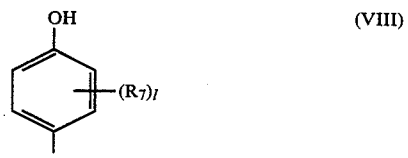

-continued

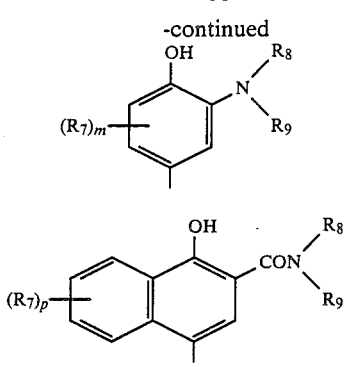

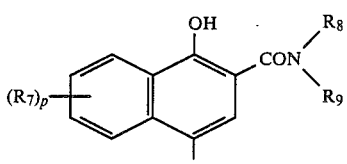

wherein R₇ represents a hydrogen atom, a halogen atom, an alkoxycarbonylamino group, an aliphatic hydrocarbon residue, an N-arylureido group, an acylamino group, an —O—R₁₂ group or an —S—R₁₂ group (wherein R₁₂ represents an aliphatic hydrocarbon residue); R₈ and R₉ each represents an aliphatic hydrocarbon residue, an aryl group or a heterocyclic group, one of R₈ and R₉ may be a hydrogen atom, or R₈ and R₉ may combine with each other to form a nitrogen-containing heterocyclic nucleus; l represents an integer of 1 to 4; m represents an integer of 1 to 3; and p represents an integer of 1 to 5.

19. A silver halide color photographic material as claimed in Claim 18, wherein the aliphatic hydrocarbon group, the aryl group or the heterocyclic group represented by R₇, R₈ or R₉ may be substituted with a substituent selected from a halogen atom, a nitro group, a hydroxy group, a carboxy group, an amino group, a substituted amino group, a sulfo group, an alkyl group, an alkenyl group, an aryl group, a heterocyclic group, an alkoxy group, an aryloxy group, an arylthio group, an arylazo group, an acylamino group, a carbamoyl group, an ester group, an acyl group, an acyloxy group, a sulfonamido group, a sulfamoyl group, a sulfonyl group and a morpholino group.

20. A silver halide color photographic material as claimed in claim 1, wherein A represents said noncolor forming coupler residue which is represented by the general formula (XI) or (XII):

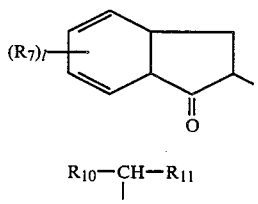

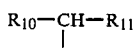

wherein R₇ represents a hydrogen atom, a halogen atom, an alkoxy carbonylamino group, aliphatic hydrocarbon residue, an N-arylureido group, an acylamino group, an —O—R₁₂ group or an —S—R₁₂ group (wherein R₁₂ represents an aliphatic hydrocarbon residue); l represents an integer of 1 to 4; R₁₀ represents an arylcarbonyl gorup, an alkanoyl group having from 2 to 32 carbon atoms, an arylcarbamoyl group, an alkanecarbamoyl group having from 2 to 32 carbon atoms, an alkoxycarbonyl group having from 1 to 32 carbon atoms or an aryloxycarbonyl group each of which may be substituted with a substituent selected from an alkoxy group, an alkoxycarbonyl group, an acylamino group, an alkylsulfamoyl group, an alkylsulfonamido group, an alkylsuccinimido group, a halogen atom, a nitro group, a carboxy group, a nitrile group, an alkyl group and an aryl group; and R₁₁ represents an arylcarbonyl group, an alkanoyl group having from 2 to 32 carbon atoms, an arylcarbamoyl group; an alkanecarbamoyl group having from 2 to 32 carbon atoms, an alkoxycarbonyl group having from 1 to 32 carbon atoms, an aryloxycarbonyl group, alkanesulfonyl group having from 1 to 32 carbon atoms, an arylsulfonyl group, an aryl group or a 5-membered or 6-membered heterocylic group each of which may be substituted with a substituent selected from the substituents as defined for R₁₀.

21. A silver halide color photographic material as claimed in claim 1, wherein said polymer coupler is derived from a monomer coupler represented by the general formula (XIV) and contains a repeating unit represented by the general formula (XV):

$$CH_2=C(A_2)_i(A_3)_j(A_1)_kQ \quad \text{(XIV)}$$
$$\begin{array}{c} R \\ | \\ \end{array}$$

$$-(CH_2-C)- \quad \text{(XV)}$$
$$(A_2)_i(A_3)_j(A_1)_kQ$$

wherein R represents a hydrogen atom, a lower alkyl group containing 1 to 4 carbon atoms or a chloride atom; A₁ represents —CONH—, —NHCONH—, —NHCOO—, —COO—, —SO₂—, —CO—, —NHCO—, —SO₂NH—, —NHSO₂—, —OCO—, —OCONH—, —NH— or —O—; A₂ represents —CONH— or —COO—; A₃ represents an unsubstituted or substituted alkylene group having from 1 to 10 carbon atoms which may be a straight chain or a branched chain, an aralkylene group or an unsubstituted or substituted arylene group; Q represents a residue of the compounds represented by the general formula (I) which may be bonded at any portion of A and Dye; and i, j and k each represents 0 or 1, provided that all of i, j and k are not 0 at the same time.

22. A silver halide color photographic material as claimed in claim 21, wherein the substituent for the alkylene group, aralkylene group or arylene group represented by A₃ is an aryl group, a nitro group, a hydroxy group, a cyano group, a sulfo group, an alkoxy group, an aryloxy group, an acyloxy group, an acylamino group, a sulfonamido group, a sulfamoyl group, a halogen atom, a carboxy group, a carbamoyl group, an alkoxycarbonyl group or a sulfonyl group.

23. A silver halide color photographic material as claimed in claim 1, wherein A represents a coupler residue which color of the dye is substantially the same as that of X-Dye and which does not contain a diffusion resistant group having 10 or more carbon atoms.

24. A silver halide color photographic material as claimed in claim 1, wherein A represents a coupler residue which has at least one group selected from a carboxyl group and a sulfo group as a substituent and which forms a dye capable of being flowed out from the photographic material after the coupling reaction with the oxidation product of a developing agent.

25. A silver halide color photographic material as claimed in claim 1, X represents an oxygen atom.

26. A silver halide color photographic material as claimed in claim 1, X represents a sulfur atom.

27. A silver halide color photographic material as claimed in claim 1, X represents an imino group.

28. A silver halide color photographic material as claimed in claim 1, wherein —X—Dye is a group represented by the general formula (XIII):

wherein X has the same meaning as defined in the general formula (I); Y represents an atomic group which contains at least one unsaturated bond having the conjugated relationship with the azo group and which is connected to X through the atom constituting the above described unsaturated bond; Z represents an atomic group containing at least one unsaturated bond capable of conjugating with the azo group; and a total number of the carbon atoms included in Y and Z is 10 or more.

29. A silver halide color photographic material as claimed in claim 28, wherein X is an oxygen atom or a sulfur atom.

30. A silver halide color photographic material as claimed in claim 28, wherein Y and Z each represents a substituted or unsubstituted aromatic group or a substituted or unsubstituted unsaturated heterocyclic group.

31. A silver halide color photographic material as claimed in claim 30, wherein said aromatic group is a substituted or unsubstituted phenyl group or naphthyl group.

32. A silver halide color photographic material as claimed in claim 30, wherein said unsaturated heterocyclic group is a 4-membered to 7-membered heterocyclic group containing at least one hetero atom selected from a nitrogen atom, a sulfur atom and an oxygen atom; and a condensed ring thereof with a benzene.

33. A silver halide color photographic material as claimed in claim 30, wherein Y has a substituent in addition to X and the azo group wherein said substituent include an aliphatic group, an aromatic group, an acyl group, an alkoxycarbonyl group, an aryloxycarbonyl group, an acylamino group, an alkylthio group, an arylthio group, a heterocyclic group, a sulfonyl group, a halogen atom, a nitro group, a nitroso group, a cyano group, a carboxyl group, a hydroxy group, a sulfonamido group, an alkoxy group, an aryloxy group, an acyloxy group, a carbamoyl group, an amino group, a ureido group, a sulfamoyl group, a carbamoylsulfonyl group or a hydrazinyl group, etc; and these substituents may be further substituted.

34. A silver halide color photographic material as claimed in claim 28, wherein the group represented by the formula (XIII) is represented by the general formula (D-1):

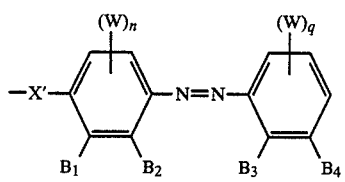

wherein X' represents a oxygen atom or a sulfur atom; W represents a substituent selected from the substituents defined for Y and Z in the general formula (XIII); n represents 0, 1 or 2; q represents 0, 1, 2 or 3; $B_1$, $B_2$, $B_3$ and $B_4$ each represents a hydrogen atom or a substituent as defined for W, or $B_1$ and $B_2$ or $B_3$ and $B_4$ may be bonded each other to form a condensed ring on the benzene.

35. A silver halide color photographic material as claimed in claim 28, wherein the group represented by the formula (XIII) is represented by the general formula (D-2):

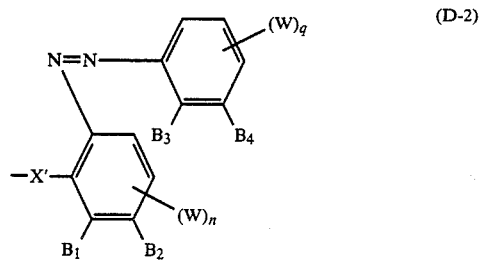

wherein X' represents an oxygen atom or a sulfur atom; W represents a substituent selected from the substituents defined for Y and Z in the general formula (XIII); n represents 0, 1 or 2; q represents 0, 1, 2 or 3; $B_1$, $B_2$, $B_3$ and $B_4$ each represents a hydrogen atom or a substituent as defined for W, or $B_1$ and $B_2$ or $B_3$ and $B_4$ may be bonded each other to form a condensed ring on the benzone.

36. A silver halide color photographic material as claimed in claim 28, wherein the group represented by the formula (XIII) is represented by general formula (D-3):

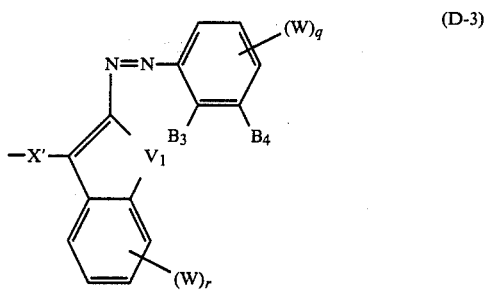

wherein X' represents an oxygen atom or a sulfur atom; W represents a substituent selected from the substituents defined for Y and Z in the general formula (XIII); q represents 0, 1, 2 or 3; r represents 0, 1, 2, 3 or 4; $B_3$ and $B_4$ each represents a hydrogen atom or a substituent as defined for W, or $B_3$ and $B_4$ may be bonded each other to form a condensed ring on the benzene; $V_1$ represents a sulfur atom, an oxygen atom or an imino group which may be substituted.

37. A silver halide color photographic material as claimed in claim 28, wherein the group represented by the formula (XIII) is represented by the general formula (D-4):

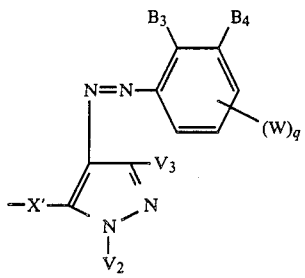

(D-4)

wherein X' represents an oxygen atom or a sulfur atom; W represents a substituent selected from the substituents defined for Y and Z in the general formula (XIII); q represents 0, 1, 2 or 3; $B_3$ and $B_4$ each represents a hydrogen atom or a substituent as defined for W, or $B_3$ and $B_4$ may be bonded each other to form a condensed ring on the benzene; $V_2$ represents an aliphatic hydrocarbon group, an aryl group or a heterocyclic group; $V_3$ represents a straight chain or branched chain alkyl group having from 1 to 32 carbon atoms, an alkenyl group, a cycloalkyl group, an aralkyl group, a cycloalkenyl group, an aryl group, a heterocyclic group, an alkoxycarbonyl group, an aryloxycarbonyl group, an aralkyloxycarbonyl group, an alkoxy group, an aryloxy group, an acylamino group, a diacylamino group, an N-alkylacylamino group, an N-arylacylamino group, a ureido group, an alkylamino group, a cycloalkylamino group, a sulfanamido group, a halogen atom or a cyano group.

38. A silver halide color photographic material as claimed in claim 28, wherein the group represented by the formula (XIII) is represented by the general formula (D-5):

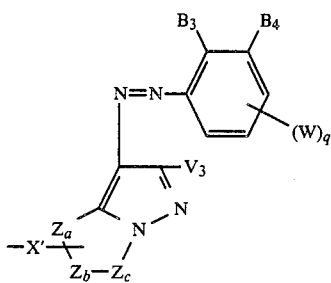

(D-5)

wherein X' represents an oxygen atom or a sulfur atom; W represents a substituent selected from the substituents defined for Y and Z in the general formula (XIII); q represents 0, 1, 2 or 3; $B_3$ and $B_4$ each represents a hydrogen atom or a substituent as defined for W, or $B_3$ and $B_4$ may be bonded each other to form a condensed ring on the benzene; $V_3$ represents a straight chain or branched chain alkyl group having from 1 to 32 carbon atoms, an alkenyl group, a cycloalkyl group, an aralkyl group, a cycloalkenyl group, an aryl group, a heterocyclic group, an alkoxycarbonyl group, an aryloxycarbonyl group, an aralkyloxycarbonyl group, an alkoxy group, an aryloxy group, an acylamino group, a diacylamino group, an N-alkylacylamino group, an N-arylacylamino group, a ureido group, an alkylamino group, a cycloamino group, a sulfonamido group, a halogen atom or a cyano group, and Za, Zb, and Zc each represents a methine group, a substituted methine group =N— or —NH—, and one of the Za-Zb bond and Zb-Zc bond is a double bond and the other is a single bond, provided that all of Za, Zb and Zc do not represents N at the same time, any one of Za, Zb and Zc is bonded to form a connection of —X'—C=.

39. A silver halide color photographic material as claimed in claim 28, wherein the group represented by the formula (XIII) is represented by the general formula (D-6):

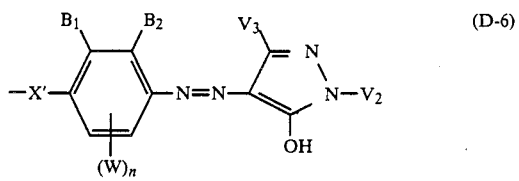

(D-6)

wherein X' represents an oxygen atom or a sulfur atom; W represents a substituent selected from the substituents defined for Y and Z in the general formula (XIII); n represents 0, 1 or 2; $B_1$ and $B_2$ each represents a hydrogen atom or a substituent as defined for W, or $B_1$ and $B_2$ may be bonded each other to form a condensed ring on the benzene; $V_2$ represents an aliphatic hydrocarbon group, an aryl group or a heterocyclic group; $V_3$ represents a straight chain or branched chain alkyl group having from 1 to 32 carbon atoms, an alkenyl group, a cycloalkyl group, an aralkyl group, a cycloalkenyl group, an aryl group, a heterocyclic group, an alkoxycarbonyl group, an aryloxycarbonyl group, an aralkyloxycarbonyl group, an alkoxy group, an aryloxy group, an acylamino group, a diacylamino group, an N-alkylacylamino group, an N-arylacylamino group, a ureido group, an alkylamino group, a cycloamino group, a sulfonamido group, a halogen atom or a cyano group.

40. A silver halide color photographic material as claimed in claim 34, wherein X' represents an oxygen atom.

41. A silver halide color photographic material as claimed in claim 35, wherein X' represents an oxygen atom.

42. A silver halide color photographic material as claimed in claim 36, wherein X' represents an oxygen atom.

43. A silver halide color photographic material as claimed in claim 37, wherein X' represents an oxygen atom.

44. A silver halide color photographic material as claimed in claim 38, wherein X' represents an oxygen atom.

45. A silver halide color photographic material as claimed in claim 39, wherein X' represents an oxygen atom.

46. A silver halide color photographic material as claimed in claim 1, wherein a total number of the carbon atoms included in X-Dye is 10 or more.

* * * * *